(12) United States Patent
Ogura

(10) Patent No.: US 11,223,241 B2
(45) Date of Patent: Jan. 11, 2022

(54) ELECTRIC POWER TRANSMISSION DEVICE AND ELECTRIC POWER TRANSMISSION SYSTEM

(71) Applicant: KABUSHIKI KAISHA TOSHIBA, Tokyo (JP)

(72) Inventor: Koji Ogura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 50 days.

(21) Appl. No.: 16/292,372

(22) Filed: Mar. 5, 2019

(65) Prior Publication Data

US 2020/0021146 A1 Jan. 16, 2020

(30) Foreign Application Priority Data

Jul. 12, 2018 (JP) .............................. JP2018-132587

(51) Int. Cl.
*H02J 50/70* (2016.01)
*H02J 50/40* (2016.01)
*H02J 50/10* (2016.01)

(52) U.S. Cl.
CPC .............. *H02J 50/70* (2016.02); *H02J 50/10* (2016.02); *H02J 50/40* (2016.02)

(58) Field of Classification Search
CPC .. H02J 50/00; H02J 50/10; H02J 50/40; H02J 50/70; H02J 50/12
See application file for complete search history.

(56) References Cited

U.S. PATENT DOCUMENTS

| 2012/0032521 A1 | 2/2012 | Inoue et al. |
| 2012/0086281 A1* | 4/2012 | Kanno ..................... H01Q 7/00 307/82 |

(Continued)

FOREIGN PATENT DOCUMENTS

| JP | 2010-193598 A | 9/2010 |
| JP | 4671515 B2 | 4/2011 |

(Continued)

OTHER PUBLICATIONS

Kim et al., "EMI Reduction in Wireless Power Transfer System Using Spread Spectrum Frequency Dithering," IEEE Wireless Power Transfer Conference, 3 pages (2016).

*Primary Examiner* — Hal Kaplan
*Assistant Examiner* — Joseph N Inge
(74) *Attorney, Agent, or Firm* — Finnegan, Henderson, Farabow, Garrett & Dunner L.L.P.

(57) ABSTRACT

One aspect of the present invention is an electric power transmission device that periodically shifts a frequency of a magnetic field to a plurality of predetermined shift values and that transmits electric power by utilizing the magnetic field. The device includes a plurality of power transmitters and an instructor. Each of the plurality of power transmitters configured to generate a magnetic field. The instructor outputs an instruction signal indicating a shift value to be shifted to each of the power transmitters to instruct the shift value to be shifted to each of the power transmitters. Further, the instructor instructs the shift value to be shifted in such a manner that at least a part of the magnetic fields of the plurality of power transmitters are different in frequency at the same time point.

11 Claims, 16 Drawing Sheets

(56) References Cited

U.S. PATENT DOCUMENTS

| | | | |
|---|---|---|---|
| 2015/0236518 A1* | 8/2015 | Matsumoto | H02J 7/025 307/104 |
| 2015/0236526 A1* | 8/2015 | Jadidian | H02J 50/90 320/108 |
| 2016/0094048 A1* | 3/2016 | Bae | H02J 7/007 307/104 |
| 2016/0336759 A1* | 11/2016 | Yamamoto | G01V 3/101 |
| 2016/0365737 A1* | 12/2016 | Vladan | H02J 7/025 |
| 2017/0012477 A1* | 1/2017 | Shijo | B60L 53/38 |
| 2018/0062442 A1* | 3/2018 | Qiu | H02J 50/12 |
| 2018/0123646 A1* | 5/2018 | Onishi | H02J 7/025 |
| 2018/0269717 A1* | 9/2018 | Shijo | B60L 53/122 |
| 2019/0006843 A1 | 1/2019 | Suzuki et al. | |
| 2019/0288541 A1 | 9/2019 | Ogura | |
| 2019/0288568 A1 | 9/2019 | Ogura et al. | |

FOREIGN PATENT DOCUMENTS

| | | |
|---|---|---|
| JP | 2015-33316 A | 2/2015 |
| JP | 2018-41796 A | 3/2018 |
| JP | 2018-157614 A | 10/2018 |
| JP | 2019-17134 A | 1/2019 |
| JP | 2019-161860 A | 9/2019 |
| JP | 2019-161866 A | 9/2019 |
| WO | WO 2015/189976 A1 | 12/2015 |

\* cited by examiner

| i-TH POINT OF TIME | | 1 | 2 | 3 | 4 | 5 | 6 | 7 | 8 | 9 | 10 | 11 | 12 | 13 | ... |
|---|---|---|---|---|---|---|---|---|---|---|---|---|---|---|---|
| LINE A | FREQUENCY (SHIFT VALUE) | f1 | f2 | f3 | f4 | f5 | f5 | f4 | f3 | f2 | f1 | f1 | f2 | f3 | ... |
| | SHIFTING PHASE | 0 | 45 | 90 | 135 | 180 | 180 | 225 | 270 | 315 | 360 (0) | 360 (0) | 405 (45) | 450 (90) | ... |
| LINE B | FREQUENCY (SHIFT VALUE) | f5 | f4 | f3 | f2 | f1 | f1 | f2 | f3 | f4 | f5 | f5 | f4 | f3 | ... |
| | SHIFTING PHASE | 180 | 225 | 270 | 315 | 360 (0) | 360 (0) | 405 (45) | 450 (90) | 495 (135) | 540 (180) | 540 (180) | 585 (225) | 630 (270) | ... |

FIG. 6

① ——→ FROM 0° TO 180°
② ------→ FROM 0° TO 180°
③ ——→ FROM 0° TO 180°

←—— ① FROM 180° TO 360°
←------ ② FROM 180° TO 360°
←—— ③ FROM 180° TO 360°

——→ ① FROM 90° TO 180°, FROM 0° TO 90°
——→---→ ② FROM 90° TO 180°, FROM 0° TO 90°
---→——→ ③ FROM 90° TO 180°, FROM 0° TO 90°
——→

ELECTRIC POWER TRANSMISSION DEVICE AND ELECTRIC POWER TRANSMISSION SYSTEM

CROSS-REFERENCE TO RELATED APPLICATION (S)

This application is based upon and claims the benefit of priority from Japanese Patent Application No. 2018-132587, filed Jul. 12, 2018; the entire contents of which are incorporated herein by reference.

FIELD

Embodiments described herein relate generally to an electric power transmission device and an electric power transmission system.

BACKGROUND

Contactless power transmission (contactless power supply) from an electric power transmission device to an electric power reception device is becoming popularized. In the contactless power supply, a power transmission circuit generates high-frequency current of a predetermined frequency, the high-frequency current excites a power transmission coil, and a magnetic field generated by the excitation transmits electric power. In the contactless power supply, however, there is concern that a magnetic field leaked to the outside (leakage electromagnetic field) may interfere with broadcasting, wireless communication, and the like. Therefore, the contactless power supply is required to suppress the leakage electromagnetic field so as to satisfy restrictions relating to the upper limit of the leakage electromagnetic field determined by international standards and the like.

One of techniques capable of suppressing the leakage electromagnetic field is frequency hopping. Frequency hopping is a technique for periodically causing the power transmission frequency to shift so as to spread and reduce the leakage electromagnetic field. However, when the frequency hopping is performed, the output current from the electric power reception device may become pulsating current larger in ripple depending on frequency characteristics. Therefore, there is a risk that a battery or the like may fail when receiving the output current. In order to prevent this, it is necessary to control input power and correct frequency characteristics of the electric power transmission device and the electric power reception device. However, it is difficult to accurately grasp changing frequency characteristics.

BRIEF DESCRIPTION OF THE DRAWINGS

FIG. 6 is a diagram illustrating frequency shifting in lines A and B.

DETAILED DESCRIPTION

Figure 1:
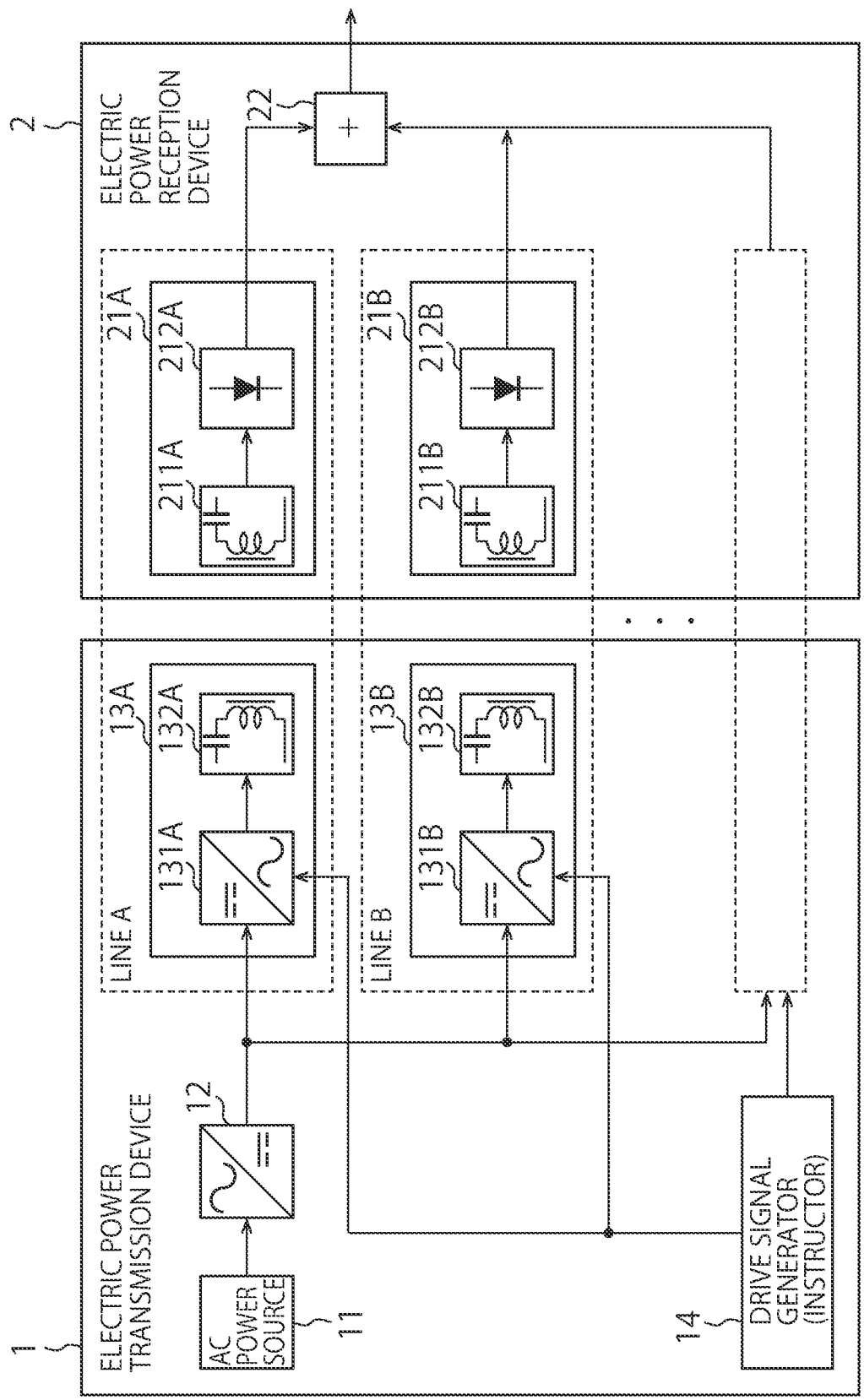
FIG. 1 is a block diagram illustrating an example of an electric power transmission system according to a first embodiment.

An embodiment of the present invention provides an apparatus capable of reducing the ripple in the output current of a power reception device, in a contactless electric power transmission system including a plurality of electric power transmission lines, without grasping frequency characteristics in advance.

One aspect of the present invention is an electric power transmission device that periodically shifts a frequency of a magnetic field to a plurality of predetermined shift values and that transmits electric power by utilizing the magnetic field. The device includes a plurality of power transmitters and an instructor. Each of the plurality of power transmitters configured to generate a magnetic field. The instructor outputs an instruction signal indicating a shift value to be shifted to each of the power transmitters to instruct the shift value to be shifted to each of the power transmitters. Further, the instructor instructs the shift value to be shifted in such a manner that at least a part of the magnetic fields of the plurality of power transmitters are different in frequency at the same time point.

Below, a description is given of embodiments of the present invention with reference to the drawings. The present invention is not limited to the embodiments. In the drawings, each alphabet suffixed to a reference numeral is attached for distinguishing each individual denoted by the same reference numeral.

First Embodiment

FIG. 1 is a block diagram illustrating an exemplary electric power transmission system according to a first embodiment. The electric power transmission system according to the first embodiment includes an electric power transmission device 1 and an electric power reception device 2. The electric power transmission device 1 transmits electric power by utilizing magnetic field. The electric power reception device 2 receives the transmitted electric power.

The electric power transmission device 1 includes an AC power source 11, an AC-DC converter 12, a plurality of power transmitters 13, and a drive signal generator (instructor) 14. Each power transmitter 13 includes an inverter 131 and a power transmission coil unit (resonator) 132. The electric power reception device 2 includes a plurality of power receptors 21 and an adder 22. Each power receptor 21 includes a power reception coil unit (resonator) 211 and a rectifier 212.

The electric power transmission system according to the present embodiment transmits electric power from the electric power transmission device 1 to the electric power reception device 2 by utilizing magnetic field generated from high-frequency current due to electromagnetic induction. That is, the electric power transmission system according to the present embodiment can realize contactless power supply to the electric power reception device 2.

Further, in the present embodiment, a plurality of electric power transmission lines is provided. That is, electric power, namely, a plurality of high-frequency currents, is transmitted from the electric power transmission device 1 to the electric power reception device 2 by utilizing a plurality of magnetic fields. It is assumed that the adder 22 sums up the plurality of high-frequency currents received by the electric power reception device and outputs the summed-up current.

In the following description, each electric power transmission line is simply referred to as a line. In FIG. 1, a first power transmitter 13A and a first power reception coil unit 211A cooperatively configure a line A. Similarly, a second power transmitter 13B and a second power reception coil unit 211B cooperatively configure a line B. However, the electric power transmission system may be configured to include three or more lines. In FIG. 1, as indicated by a dotted frame, another line different from the line A and the line B may be provided additionally. It is needless to say that the lines in the electric power transmission system may be limited to only two of the line A and the line B.

The magnetic field generated by the electric power transmission device 1 of a contactless power supply system is not only used for electric power transmission to the electric power reception device 2 but also partly influences as a leakage electromagnetic field that interferes with peripheral devices. Therefore, the electric power transmission system according to the present embodiment performs frequency hopping for spreading electric power energy to a predetermined bandwidth (spread bandwidth) on the frequency axis.

For example, the electric power transmission system shifts the switching frequency when generating high-frequency current that generates the magnetic field, thereby causing the frequency of the high-frequency current to shift. It is known that the frequency of the magnetic field band is spread thereby and the intensity thereof decreases compared to a case where no shifting occurs in the frequency of the high-frequency current. That is, the frequency hopping is to cause the frequency of the magnetic field, namely the frequency of the high-frequency current, to shift. The frequency hopping can suppress the intensity of the leakage electromagnetic field.

Figure 2A:
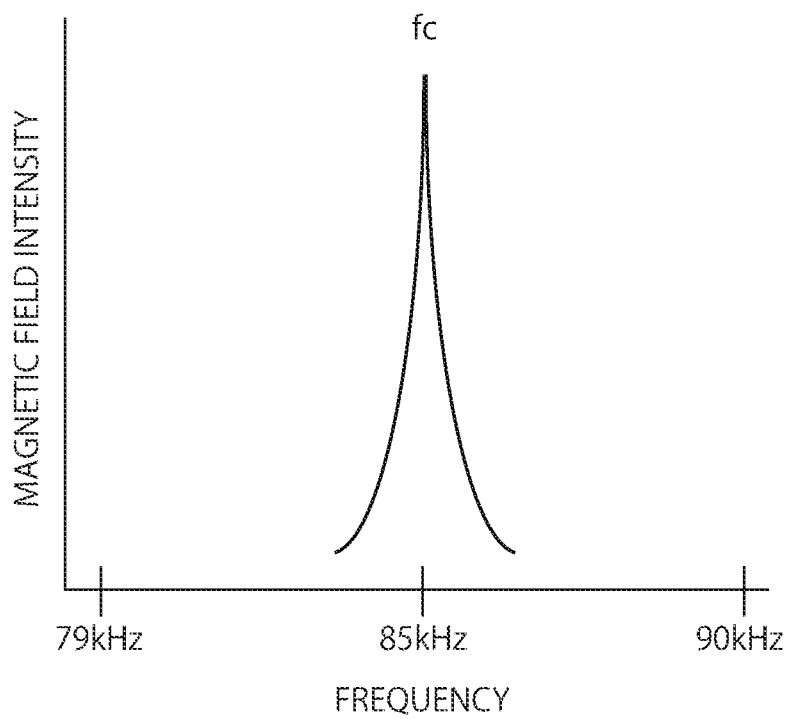
FIGS. 2A and 2B are diagrams illustrating an exemplary frequency hopping.
Figure 2B:
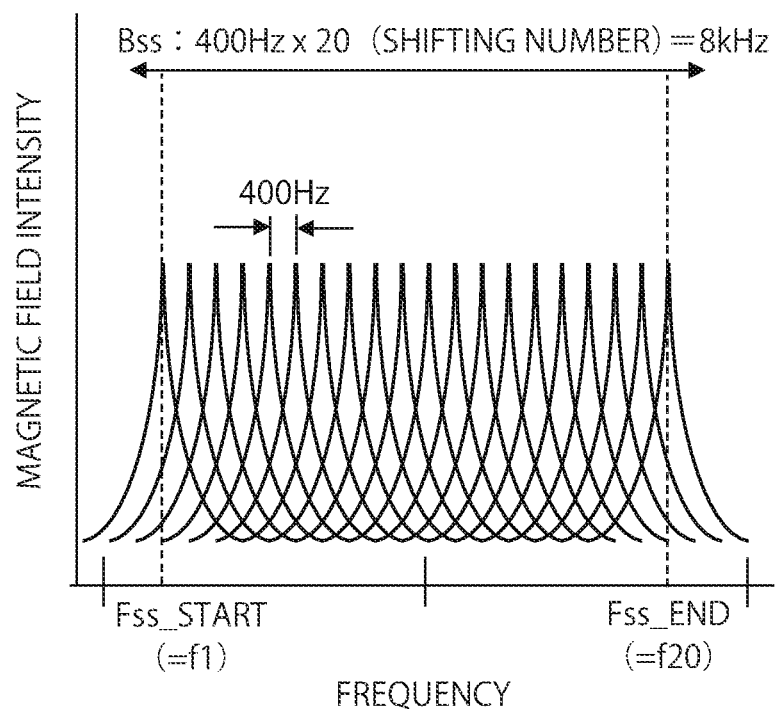

FIGS. 2A and 2B are diagrams illustrating an exemplary frequency hopping. FIG. 2A is a diagram illustrating a relationship between frequency and magnetic field intensity in the case of not performing the frequency hopping, that is, when performing electric power transmission at only one frequency. According to the example illustrated in FIG. 2A, the electric power transmission is performed only at 85 kHz. Therefore, the illustrated graph has one peak (local maximum point) at the point of 85 kHz.

FIG. 2B is a diagram illustrating a relationship between frequency and magnetic field intensity in the case of performing the frequency hopping, that is, when performing electric power transmission at a plurality of frequencies. According to the example illustrated in FIG. 2B, the electric power transmission is performed at 20 frequencies centered on 85 kHz. Therefore, the illustrated graph has 20 peaks. In particular, the smallest frequency Fss_START ($f_1$) is set to 81.2 kHz, the interval between frequencies to be used is set to 400 Hz, and the number of frequencies is 20. Accordingly, the highest frequency Fss_END ($f_{20}$) is set to 88.8 kHz.

Hereinafter, the value to which the frequency shifts when performing the frequency hopping is simply referred to as a shift value. Further, it is assumed that respective shift values are numbered in order from the smaller one, and i-th (i is an integer equal to or greater than 1) shift value is expressed as $f_i$. That is, a first shift value $f_1$ is the minimum shift value (minimum frequency), a shift value $f_i$ is the i-th largest shift value, and $f_{i+1} > f_i$ is satisfied. Further, the number of shift values is referred to as a shifting number. According to the example illustrated in FIG. 2B, the shifting number is 20.

In the frequency hopping, at certain timing, the frequency shifts from one of the shift values to another of them. Performing such shifting many times can spread the frequency and lower the intensity of the leakage electromagnetic field. The frequency difference ($f_{i+1} - f_i$) between neighboring shift values is referred to as a shifting width. In the following description, it is assumed that the frequency hopping is shifting to a neighboring shift value.

In the long view, the electric power in the case of performing such frequency hopping is the same as electric power in the case of not performing the frequency hopping. Therefore, the electric power per frequency (power density) when the frequency hopping is performed is smaller than that in the case of not performing the frequency hopping. The average power amount in a long period decreases as a function of 1/Bss, Bss representing the spread bandwidth. In this manner, by performing the frequency hopping, the electric power energy can be spread at a plurality of frequencies and the power density measured as the leakage electromagnetic field can be reduced. The effect of lowering the leakage electromagnetic field by the frequency hopping is referred to as a frequency spreading effect.

The spread bandwidth may be set to be greater than the interval between the minimum frequency and the maximum frequency. In other words, in the case of determining the spread bandwidth in advance, the maximum frequency and the minimum frequency may be determined in such a manner that the interval between the maximum frequency and the minimum frequency becomes smaller than the spread bandwidth. This is because, if the interval between the maximum frequency and the minimum frequency is equalized with the spread bandwidth, it may exceed the spread bandwidth due to the spread of the frequency when performing the frequency hopping. According to the example illustrated in FIG. 2B, by defining the spread bandwidth as the number of frequencies×the shifting width and setting the spread bandwidth to be 8 kHz (20×400 Hz), it is set to be larger than the interval between the maximum frequency and the minimum frequency (Fss_END−Fss_START=7.6 kHz). That is, a half bandwidth of the shifting width is given as a buffer to both ends of the band between the maximum frequency and the minimum frequency.

Figure 3:
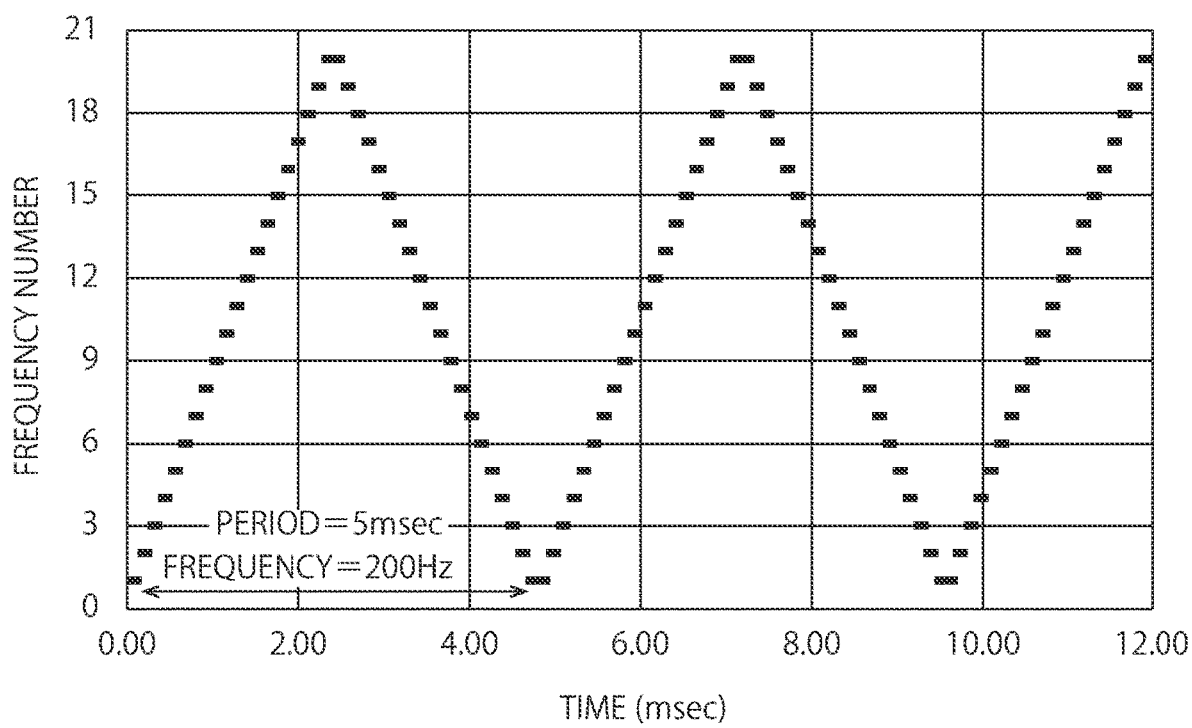
FIG. 3 is a diagram illustrating an example of time sequential frequency shifting.

FIG. 3 is a diagram illustrating an example of time sequential frequency shifting. In FIG. 3, the horizontal axis represents the time and the vertical axis represents the number of the shift value. FIG. 3 illustrates an exemplary frequency shifting in the case of repeating the shifting based on a predetermined rule using 20 shift values from $f_1$ to $f_{20}$ illustrated in FIG. 2B. The predetermined rule is, for example, to cause the shift value to shift from the minimum value $f_1$ in ascending order, and after reaching the maximum value $f_{20}$, cause the shift value to shift in descending order to return to the minimum value Causing the frequency of the magnetic field to periodically shift to a plurality of shift values as illustrated in FIG. 3 can stably obtain the frequency spreading effect. That is, in order to realize a periodic shifting of the frequency, it is preferred to perform control in such a manner that the shifting to the same shift value occurs repeatedly at constant intervals.

When k is defined as an integer greater than 1, one cycle in the periodic shifting illustrated in FIG. 3 is from a time point when the frequency shifts from the shift value $f_{k+1}$ or $f_{k-1}$ to the shift value $f_k$ to a subsequent time point when the frequency shifts again from the same shift value $f_{k+1}$ or $f_{k-1}$ to the shift value $f_k$. The one cycle is, for example, from the time point when the frequency shifts from the shift value $f_{11}$ to the shift value $f_{12}$ to the subsequent time point when the frequency shifts again from the shift value $f_{11}$ to the shift value $f_{12}$.

In the present embodiment, the shift value at the start of frequency hopping, namely an initial value, varies depending on the line. Further, the order of shifting is also variable depending on the line. The frequency sustaining time is assumed to be the same in each line, but it may be differentiate for each shift value. For example, in FIG. 3, the sustaining times of the shift values and $f_{20}$ are doubled. When outputting a drive signal for causing the frequency to shift to the shift value $f_1$ or $f_{20}$, this may be realized by outputting a drive signal for causing the frequency to shift to the same shift value $f_1$ or $f_{20}$ again at the next timing for adjusting the drive signal.

As illustrated in FIG. 3, since the frequency first shifts in ascending order or in descending order and then shifts oppositely, the shape of the shifting on the graph is triangular. Therefore, such a shifting state is referred to as a "triangular wave shift".

In the present embodiment, frequency spreading can be obtained through such frequency hopping, that is, by causing the frequency of the high-frequency current to sequentially shift at constant time intervals, simultaneously in respective lines. However, in the case of providing a plurality of lines as in the present embodiment, if the frequency hopping is performed without any control in each line, the output current from the electric power reception device 2 to be generated by combining the high-frequency currents of respective lines may become a pulsating current larger in ripple.

In general, the contactless power supply system has amplitude characteristics in which the amplitude differs for each frequency. Therefore, the output power to be obtained in each frequency when performing the frequency hopping varies depending on the frequency amplitude characteristics. It causes that the high-frequency current in each line increases and decreases with shifting of the frequency and its waveform undulates. If high-frequency currents having large amplitude are combined, the combined amplitude further increases and the output current will become a pulsating current larger in ripple. Therefore, in the present embodiment, by adjusting the order of frequency shifting for each line, the ripple of the output current from the electric power reception device 2 is reduced. Details of an adjustment method will be described below together with constituent components.

An internal configuration of the electric power transmission device 1 is described below.

The AC power source 11 supplies AC current to the AC-DC converter 12. The AC power source 11 may be a three-phase power source or a single-phase power source. In addition, a power-factor improving circuit, a rectifier, and the like may be connected to the AC power source 11.

The AC-DC converter 12 converts the supplied AC current into DC current. Then, the DC current from the AC-DC converter 12 is transmitted to each power transmitter 13. The AC-DC converter 12 may be configured to adjust the amount of power transmission so as to control the voltage and the current of electric power to be supplied to the power transmitter 13. That is, the AC-DC converter 12 may step up or down the input voltage of the inverter 131 (namely, the output voltage of the AC-DC converter 12) to a preferred voltage value.

Each power transmitter 13 generates a magnetic field of the frequency based on the drive signal from the drive signal generator 14, by using the DC current from the AC-DC converter 12. The inverter 131 in the power transmitter 13 generates high-frequency current from the DC current supplied from the AC-DC converter 12. In particular, the inverter 131 includes a plurality of switching elements (hereinafter, referred to as switches) as constituent components, and each switch performs switching so as to convert the input DC current into AC current (high-frequency current) of a preferred frequency at instructed timing. The timing of conversion is based on the drive signal (switching signal) from the drive signal generator 14. That is, high-frequency current generation and the frequency hopping are performed based on the drive signal. Then, the high-frequency current flows and it causes that the power transmission coil unit 132 in the power transmitter 13 generates a magnetic field of the same frequency.

Figure 4:
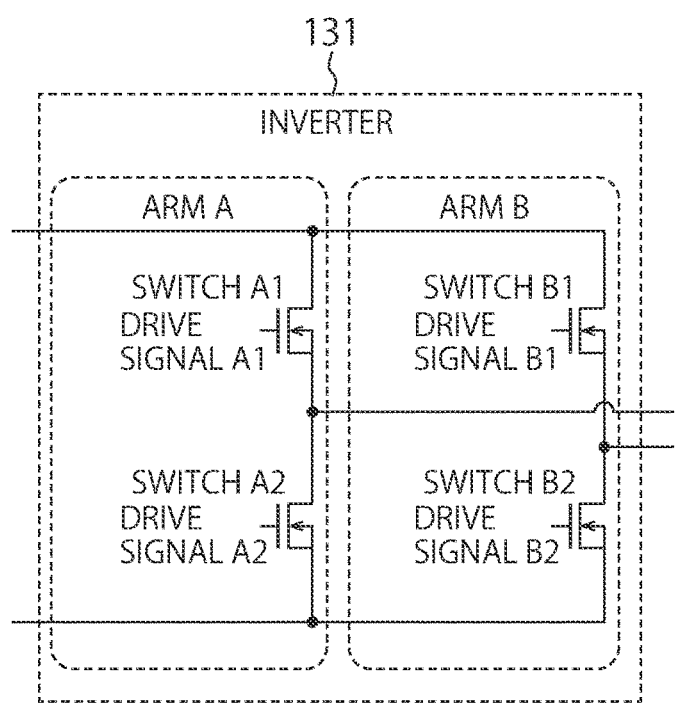
FIG. 4 is a diagram illustrating an exemplary configuration of an inverter.

FIG. 4 is a diagram illustrating an exemplary configuration of the inverter 131 in the power transmitter 13. According to the example illustrated in FIG. 4, a switch A1 and a switch A2 are connected in series so as to configure a leg A with the switch A1 as an upper arm and the switch A2 as a lower arm. Further, a switch B1 and a switch B2 are connected in series so as to configure a leg B with the switch B1 as an upper arm and the switch B2 as a lower arm. Further, the leg A and the leg B are connected in parallel. A connection node between the switch A1 and the switch A2 is connected to one end of the power transmission coil unit 132. A connection node between the switch B1 and the switch B2 is connected to the other end of the power transmission coil unit 132. Further, DC current is input to one end of the switch A1, which is not connected to the switch A2, and to one end of the switch B1, which is not connected to the switch B2. As a result, high-frequency current is generated from the DC current of the AC-DC converter 12 and flows into the power transmission coil unit 132.

When the magnetic field generated by the power transmission coil unit 132 reaches the power reception coil unit 211, mutual coupling occurs between the power transmission coil unit 132 and the power reception coil unit 211. As a result, the power reception coil unit 211 can receive electric power from the power transmission coil unit 132. In this manner, the electric power can be transmitted contactlessly. The type of the coil in the power transmission coil unit 132 may be either a solenoid type or a spiral type.

The power transmission coil unit 132 may include only the coil or may additionally include a capacitor. When connected between the coil and the inverter 131, the capacitor operates as a compensation circuit. That is, the capacitor compensates the high-frequency current for the purposes of: improving the power-factor before the high-frequency current is transmitted to the coil; reducing the phase difference between the current and the voltage; and the like. The capacitor and the coil may be connected in series or may be connected in parallel.

The drive signal generator 14 generates the above-mentioned drive signal. By the generated drive signal, more specifically, by the frequency of the drive signal changing to a value corresponding to the instructed shift value, the frequency of the magnetic field generated by the power transmitter 13 finally shifts to the frequency based on the drive signal. Therefore, the drive signal can be said as an instruction signal indicating a shift value to be shifted. Further, the drive signal generator 14 can be said as an instructor that instructs a shift value to be shifted to each power transmitter 13. In the following description, when the drive signal generator 14 is described as instructing the shift value, it means that the drive signal generator 14 outputs the drive signal indicating the shift value to be shifted.

The drive signal is given as a rectangular wave to each switch. The rectangular wave can be generated based on a predetermined setting value such as a duty ratio, a dead time, or the like. The frequency of the rectangular wave is shifted sequentially and it causes that the frequency of the magnetic field for power transmission is shifted.

The timing of the frequency shifting can be instructed by dividing a clock signal and generating the drive signal based on the divided clock signal. The settings, such as the shift values; the order according to which the shift values are instructed; and the time interval of shifting (the period during which the frequency is sustained), are assumed to be registered in advance in the drive signal generator 14. That is, the drive signal generator 14 selects one shift value from a plurality of shift values determined beforehand based on a predetermined rule and outputs a drive signal adjusted so as to instruct the selected shift value. This rule, according to which the shift value to be instructed for each line is determined, varies depending on the positional relationship between shift value existing range and amplitude ratio. Therefore, how to instruct the shift value is explained below together with some examples concerning this positional relationship. In the following description, for simplification, the explanation will be made with a smaller number of shifts. However, it is unnecessary to change the actual shifting number.

Figure 5A:
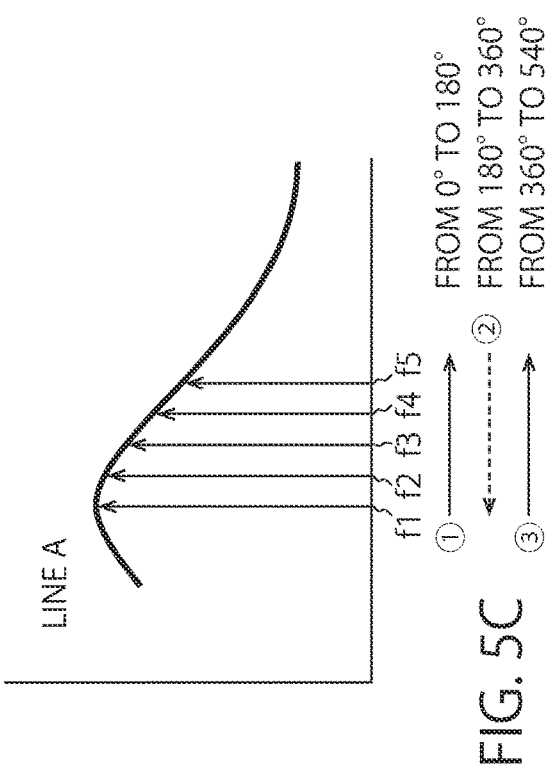
FIGS. 5A to 5D are diagrams illustrating a first example of the positional relationship between shift value range and amplitude ratio.
Figure 5C:
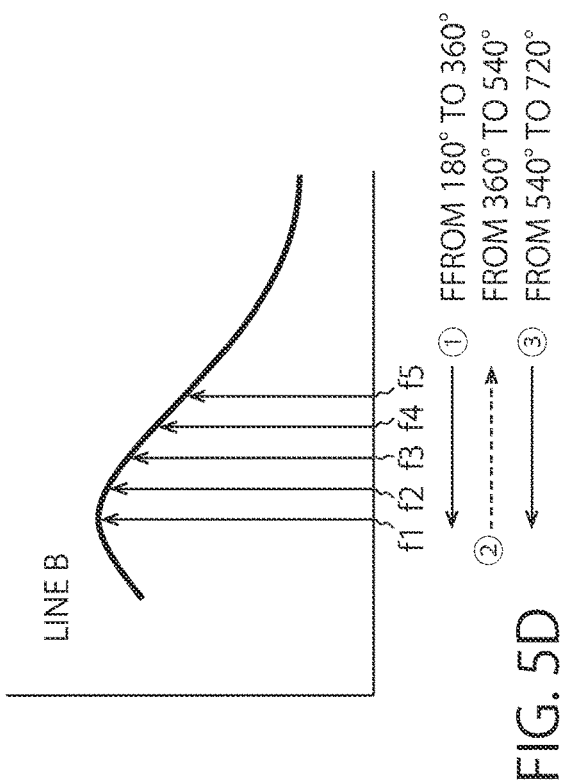
Figure 5B:
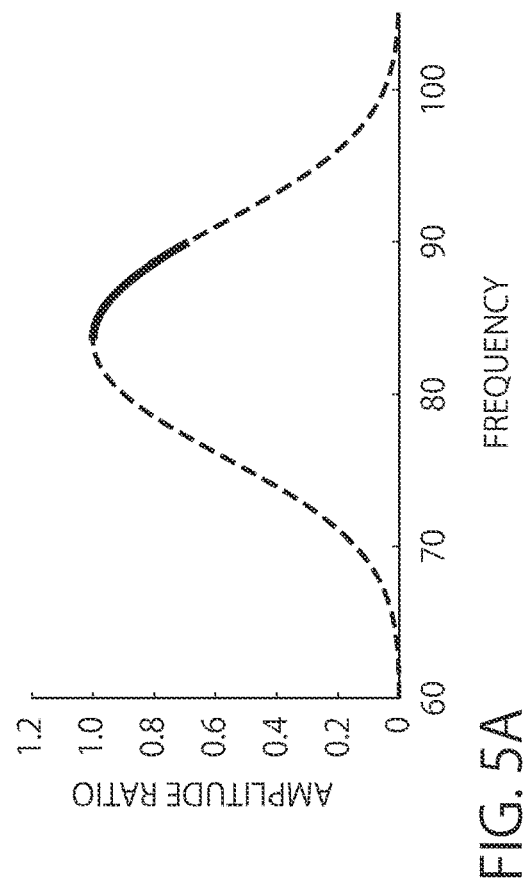
Figure 5D:
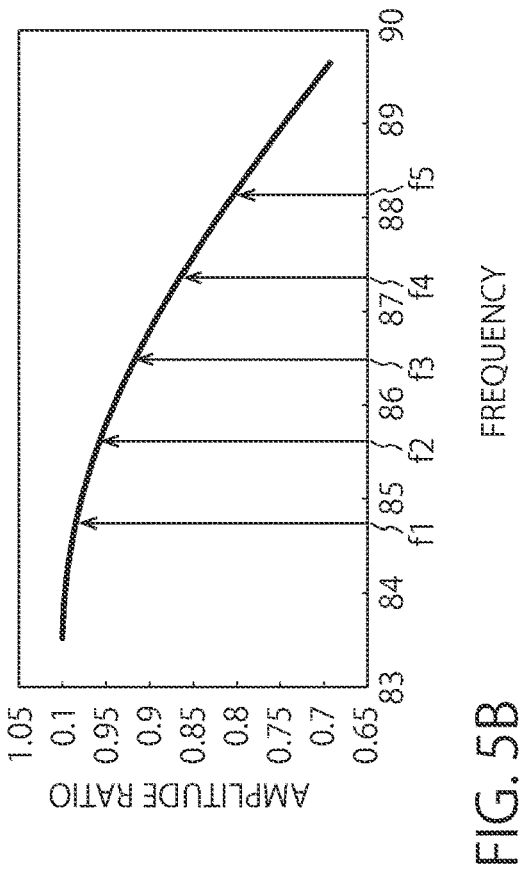

First Example of the First Embodiment, in which the Frequency Related to the Peak of Amplitude Characteristics is not Present in the Range of Shift Values FIGS. 5A to 5D are diagrams illustrating a first example of the positional relationship between shift value range and amplitude ratio. In the first example, the peak of the amplitude ratio does not exist in the shift value range. FIG. 5A is a diagram illustrating amplitude characteristics in the first example. FIG. 5B is an enlarged view of FIG. 5A in a range where the frequency shifting is performed. FIGS. 5C and 5D are diagrams illustrating the order of shifting in the line A and the line B. In FIG. 5A, the shift value range is on the right side of the peak of the amplitude ratio (that is, the minimum value of the shift value is greater than the frequency related to the peak of the amplitude ratio), although the shift value range may be on the left side of the peak of the amplitude ratio (that is, the maximum value of the shift value is smaller than the frequency related to the peak of the amplitude ratio).

The amplitude characteristics mean a relationship (graph) between frequency and amplitude ratio. The amplitude ratio represents a ratio of the electric power (or current) input from the electric power transmission device 1 to the inverter 131 to the electric power (or current) output from the adder 22 of the electric power reception device 2. That is, the graph of FIG. 5A illustrates a change in the electric power received by the electric power reception device 2 due to the frequency shifting in the case where the input to the inverter 131 is constant.

Although the amplitude characteristics are variable depending on constant values, characteristics, and positional relationships of constituent components, such as inverters, rectifiers, capacitors, coils and the like, it is assumed in the present embodiment that the electric power transmission device 1 and the electric power reception device 2 are designed so as to obtain preferred amplitude characteristics considering component irregularities, manufacturing errors, and the like.

In FIG. 5B, the shift values $f_1$ to $f_5$ are illustrated. In FIGS. 5C and 5D, the shifting orders of shift values, namely, shifting patterns, in respective lines are indicated by arrows. In the line A, first the frequency shifts sequentially from $f_1$ to $f_5$ (as indicated by arrow 1 in FIG. 5C), subsequently shifts sequentially from $f_5$ to $f_1$ (as indicated by arrow 2 in FIG. 5C), and again shifts sequentially from $f_1$ to $f_5$ (as indicated by arrow 3 in FIG. 5C). In the line B, the frequency shifts sequentially from $f_5$ to $f_1$ (as indicated by arrow 1 in FIG. 5D), subsequently shifts sequentially from $f_1$ to $f_5$ (indicated by arrow 2 in FIG. 5D), and again shifts sequentially from $f_5$ to $f_1$ (as indicated by arrow 3 in FIG. 5D). The timing of shifting is the same for the line A and the line B. Thereby, the sum of shift values of the lines A and B is equalized.

FIG. 6 is a diagram illustrating frequency shifting in the lines A and B. Shift values $f_i$ at each time point (the time point i) in the line A and the line B are shown in the table. According to the example illustrated in FIG. 6, the shift value at the first time point, namely, the initial value, is set to $f_1$, and the shifting is repeated in such a manner that the shift value shifts from the initial value $f_1$ in ascending order and after reaching the maximum value $f_5$, shifts in descending order and returns to the initial value $f_1$.

Further, the table in FIG. 6 includes shifting phases (phase angles) expressing respective shift values in the form of phase (angle). The shifting phase expresses each shift value in the form of phase (phase angle) by regarding one cycle of the periodic shifting as 360°, the one cycle including an ascending shift from the minimum value of shift values to the maximum value and a descending shift from the maximum value to the minimum value. Therefore, the shifting phase corresponding to the initial shift value $f_1$ is 0°. The shifting phase corresponding to the maximum shift value $f_5$ is 180°. The shifting phase when returning to the initial value for the first time is 360°. Further, the shifting phase when the shifting is repeated and returns to the initial value again is 720°. Therefore, when "p" is defined as an integer equal to or greater than 0, if θ represents the shifting phase, θ=θ+360×p is satisfied.

Further, the shifting phase also indicates the direction of shifting. It means that the shifting in a range of 0+360×p≤θ<180+360×p occurs in ascending order and that the shifting in a range of 180×p≤θ<360×p occurs in descending order. Accordingly, the shifting phase represents not only the shift value but also the shifting direction indicating whether the shifting occurs in ascending order or in descending order.

When instructing the shifting illustrated in FIGS. 5C and 5D, the drive signal generator 14 instructs the shift value $f_1$ for the line A and the shift value $f_5$ for the line B, as initial values that are mutually different. Then, after instructing each initial value, the drive signal generator 14 instructs a shift value identical to that instructed last time or a shift value corresponding to a phase angle that is larger by one than the phase angle corresponding to the shift value instructed last time. Thereby, the phase difference of the initial values is constantly held as the shifting phase difference between the line A and the line B. Therefore, when the minimum shift value and the maximum shift value are instructed as the initial values of the line A and the line B, the sum of shift values of the lines A and B can be equalized.

When the electric power transmission system includes M (M is an integer equal to or greater than 2) lines, it is preferred that the shifting phase difference between respective lines be kept at 360/M°. In the above-mentioned example including only two lines of the line A and the line B, the preferred shifting phase difference is 180° because M=2. In this case, the drive signal generator 14 can instruct, as the initial values, different shift values for realizing the shifting phase difference of 360/M°. In this manner, when the shifting phase difference between respective lines is kept at 360/M°, fluctuations in the electric power received by the electric power reception device 2 can be reduced. it is assumed that, as matter of course, the shifting phases of respective lines are not made the same. For example, when the total number of lines is three, it is assumed that the shifting phase of the line A is set to 0°, the shifting phase of the line B is set to 120°, and the shifting phase of the line C is set to 240°. Although the shifting phase difference of the line B becomes 120°, the shifting phase of the line C is not set to 0°. That is, it can be said that the difference between phase angles corresponding to any two of the shift values of power transmitters at the same time point is preferably coincident substantially with any one of multiples from 1 to M−1 for 360/M. In other words, when "m" is defined as an integer equal to or greater than 1 and less than M, it is preferred that the difference between the phase angles be expressed by 360(M−m)/M.

Although the shifting phase is used to express the shifting pattern of shift values in the above description, it is actually sufficient for the drive signal generator 14 to register the table illustrated in FIG. 6, in which the order of shifting is indicated together with corresponding shift values.

The electric power received by the electric power reception device 2 becomes a sum of transmission powers of respective lines added by the adder 22. Therefore, in the case of not adjusting the shifting phase difference, there is a considerable difference in amplitude ratio between when the frequencies of the lines A and B are $f_1$ and when the frequencies of the lines A and B are $f_4$. That is, large ripples occur. However, in the case of equalizing the sum of shift values of respective lines, the composite amplitude ratio does not fluctuate so much. Therefore, no large ripple occurs.

Figure 7A:
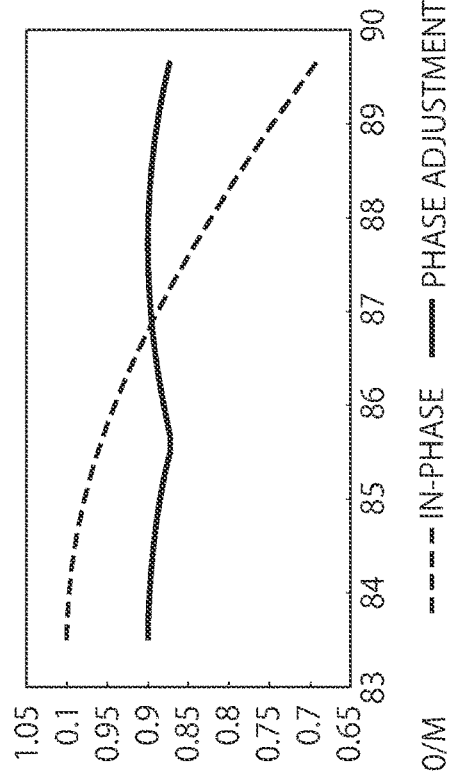
FIGS. 7A to 7C are diagrams illustrating differences in amplitude ratio when the shifting phase difference is kept at 360/M in the first example.
Figure 7C:
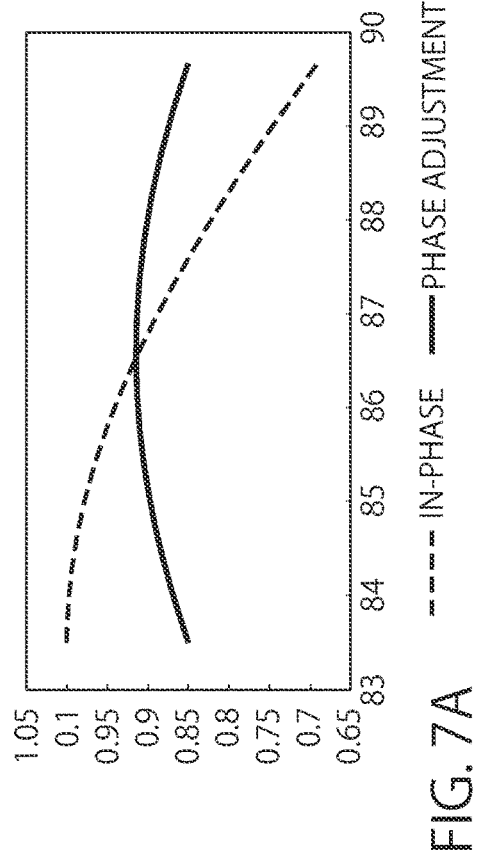
Figure 7B:
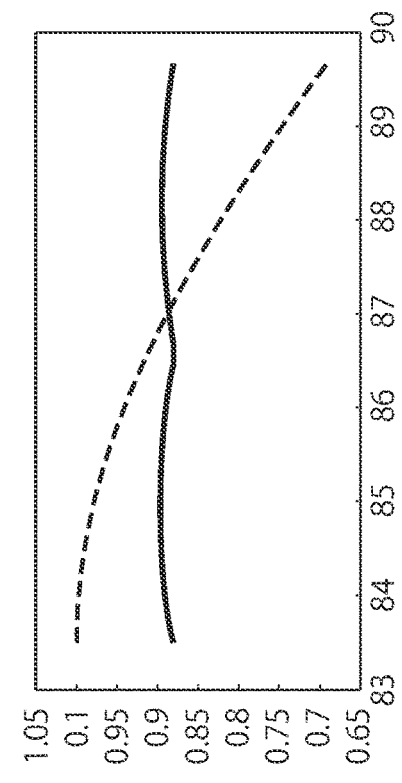

FIGS. 7A to 7C are diagrams illustrating differences in amplitude ratio when the shifting phase difference is kept at 360/M in the first example. FIG. 7A illustrates amplitude characteristics in the case of including two lines. FIG. 7B illustrates amplitude characteristics in the case of including three lines. FIG. 7C illustrates amplitude characteristics in the case of including four lines. Each solid line graph indicates amplitude characteristics when the shifting phase difference between respective lines is adjusted to 360/M. In the case of three lines, the shifting phases of the line A, the line B, and the third line are 0°, 120°, and 240°, respectively. In the case of four lines, the shifting phases of the line A, the line B, the third line, and the fourth line are 0°, 90°, 180°, and 270°, respectively. Each dotted line graph indicates comparable amplitude characteristics in the case of in-phase, that is, when the shifting occurs at the same frequency. The frequency on the horizontal axis of the graph indicates the frequency of the line A.

As illustrated in FIGS. 7A to 7C, regardless of the number of lines, the difference between the maximum amplitude ratio and the minimum amplitude ratio at the time of shifting phase adjustment is smaller than the difference between the maximum amplitude ratio and the minimum amplitude ratio in the case of in-phase. Accordingly, regardless of the number of lines, it is understood that adjusting the shifting phase can suppress the difference between the maximum amplitude ratio and the minimum amplitude ratio to be smaller than the case of not adjusting the shifting phase.

Since fluctuations in the amplitude ratio can be minimized, it is preferred to set the shifting phase difference to 360/M°. However, it may be sufficient to avoid the case of in-phase where the difference between the maximum amplitude ratio and the minimum amplitude ratio is maximized. That is, it may be sufficient to adjust in such a manner that the shifting phases of respective lines are different from each other at the same time point, in other words, so that the frequencies of the magnetic fields generated by the plurality of power transmitters 13 are different from each other.

The order of shifting in the above description is the triangular wave shifting as illustrated in FIGS. 5A to 5D and 6, in which the frequency first shifts in ascending order or in descending order and then shifts in the opposite direction. However, the order of shifting is not limited to the triangular wave shifting.

Figure 8A:
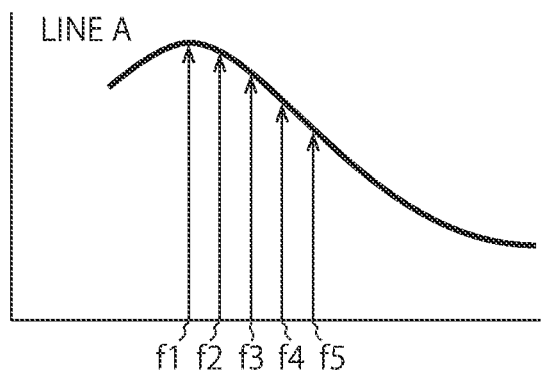
FIGS. 8A to 8C are diagrams illustrating another example of the frequency shifting.
Figure 8B:
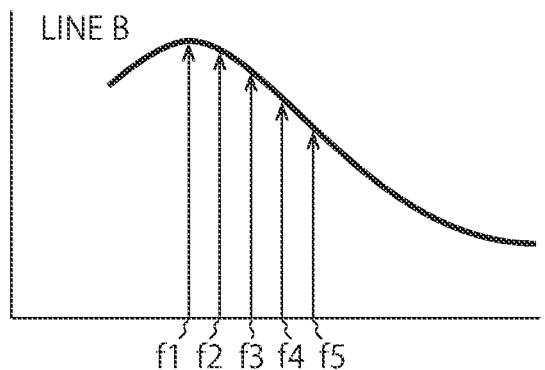
Figure 8C:
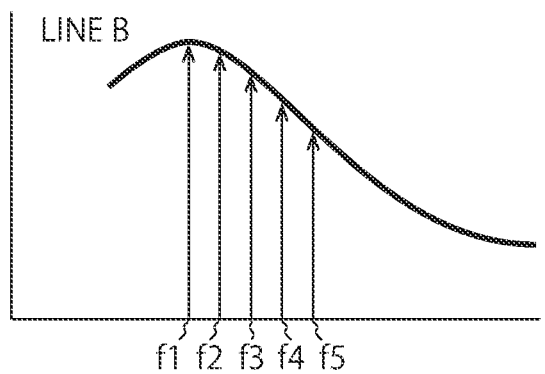

FIGS. 8A to 8C are diagrams illustrating another examples of the frequency shifting. As illustrated in FIG. 8A, in the line A, the frequency shifts in ascending order from $f_1$ to $f_5$ and then returns to $f_1$, and subsequently shifts in ascending order again. Even when the line A has such a shifting pattern, if the shifting direction of the line B is opposite to the shifting direction of the line A, the sum of shift values of the lines A and B can be equalized. That is, as illustrated in FIG. 8B, it is sufficient for the line B that the frequency first shifts in descending order from $f_5$ to $f_1$ and then returns to $f_5$, and subsequently shifts in descending order again.

The shifting pattern illustrated in FIG. 8A, if expressed by the shifting phase, is a shifting pattern repeating a cycle in which the shifting phase shifts in ascending order from 0° to 180° and then returns to 0°. The shifting pattern illustrated in FIG. 8B, if expressed by the shifting phase, is a shifting pattern repeating a cycle in which the shifting phase shifts in ascending order from 180° to 360° and then returns to 0°. Accordingly, when instructing a shift value corresponding to the phase angle of 180° for a power transmitter that has been instructed a shift value corresponding to the phase angle not less than 0° and not greater than 180° as an initial value, the drive signal generator 14 instructs a shift value corresponding to the phase angle of 0° in the next instruction. Further, when instructing a shift value corresponding to the phase angle of 360° for a power transmitter that has been instructed a shift value corresponding to the phase angle not less than 180° and not greater than 360° as an initial value, the drive signal generator 14 instructs a shift value corresponding to the phase angle of 180° in the next instruction. Thereby, the shifting patterns in FIGS. 8A and 8B are obtained. Even in this case, it is preferred that the shifting phase difference be kept at the interval of 360/M°.

If preferred the frequency shifting directions of the line A and the line B are preferred to be the same for some reasons, the shift value from which the frequency hopping starts may be made different as illustrated in FIG. 8C, so that the shifting phase difference can be held even a little. According to the example illustrated in FIG. 8C, the shifting phase difference of 90° is held. Since the shifting phase difference cannot be kept at 360/M°, the ripple becomes larger compared to the case of holding the shifting phase difference at 360/M°. However, the effect of reducing the ripple can be expected than the case of in-phase shifting.

Figure 9A:
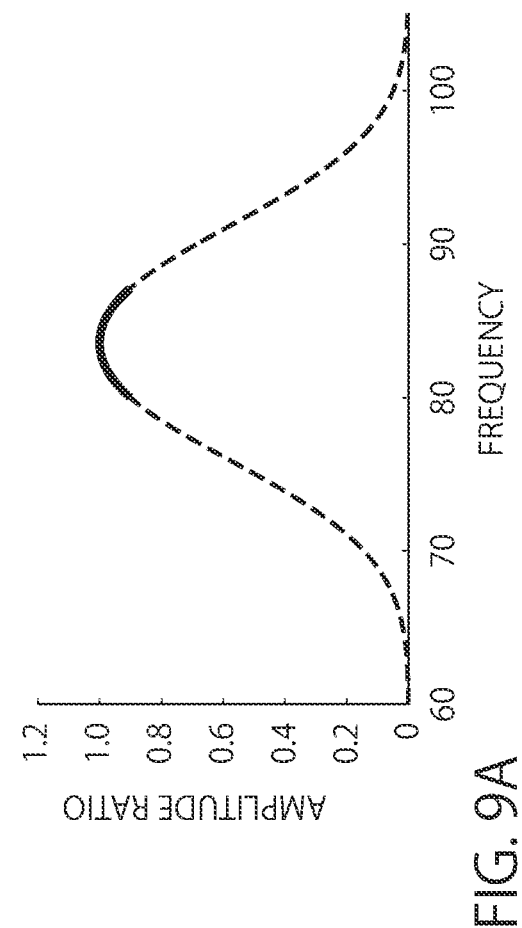
FIGS. 9A to 9D are diagrams illustrating a second example of the positional relationship between shift value range and amplitude ratio.
Figure 9C:
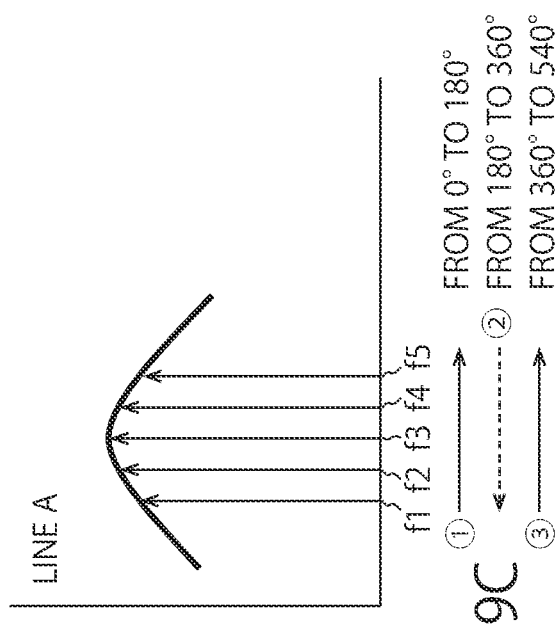
Figure 9B:
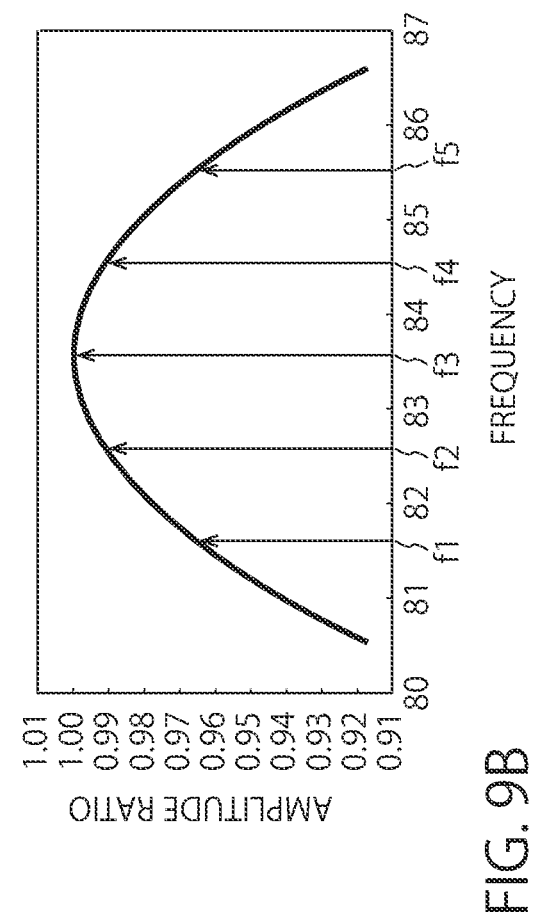
Figure 9D:
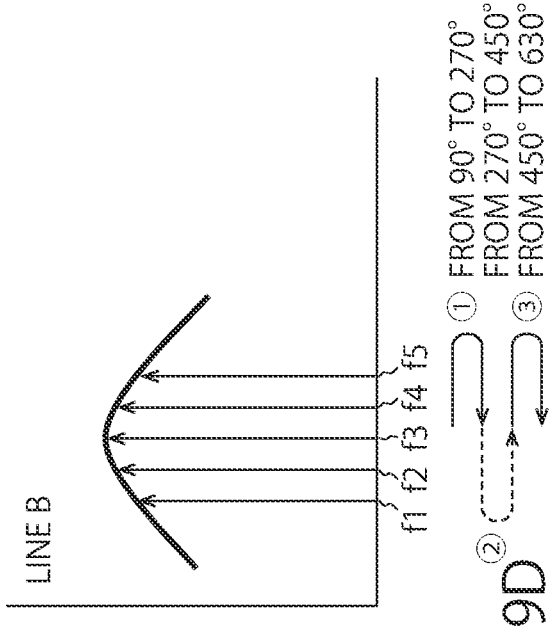

Second Example of the First Embodiment, in which the Frequency Related to the Peak of Amplitude Characteristics is Present in the Range of Shift Values FIGS. 9A to 9D are diagrams illustrating a second example of the positional relationship between shift value range and amplitude ratio. In the second example, the frequency related to the peak of the amplitude ratio is present in the shift value range. FIG. 9A is a diagram illustrating amplitude characteristics in the second example. FIG. 9B is an enlarged view of FIG. 9A in a range where the frequency shifting is performed. FIGS. 9C and 9D are diagrams illustrating the order of shifting in the line A and the line B.

In the second example, when the shifting phase difference is kept at 180° in the example case of two lines, it is feared that frequencies of both the line A and the line B may shift to the shift value where the amplitude ratio is maximized. Therefore, in the second example, the shifting phase difference is not kept at 360/M°.

The amplitude characteristics generally form a normal distribution. Therefore, when a medium value of the shift value is set to the frequency related to the peak of the amplitude ratio, the frequency shifts from the minimum shift value to the maximum shift value during a ½ cycle. Therefore, when the shifting illustrated in FIGS. 5A and 5B occurs in the line A and the line B, it is feared that both lines may shift to the peak $f_3$ at the same time point.

Accordingly, in this case, it is preferred to hold the shifting phase difference of 90° between the line A and the line B. As illustrated in FIGS. 9C and 9D, the shifting of the line A starts from $f_1$ in ascending order and the shifting of the line B starts from $f_3$ in ascending order. As illustrated in FIG. 6, when the shift value is $f_1$ and the shifting starts from this value in ascending order, the shifting phase corresponding to the shift value $f_1$ is 0°. When the shift value is $f_3$ and the shifting starts from this value in ascending order, the shifting phase corresponding to the shift value $f_3$ is 90° because there are five shift values. Accordingly, the examples illustrated in FIGS. 9C and 9D are shifting patterns in which the shifting phase difference is kept at 90°.

In general, when the number of lines of the electric power transmission system is "M", it is preferred to hold the shifting phase difference between respective lines at 180/M°. That is, it can be said that the difference between phase angles corresponding to any two of the shift values of a plurality of power transmitters at the same time point is preferably coincident substantially with any one of multiples from 1 to M−1 for 180/M. In other words, when "m" is defined as an integer equal to or greater than 1 and less than M, it is preferred that the difference between the phase angles be expressed by 180(M−m)/M.

If the shifting phase difference cannot be kept at 180/M°, by setting the maximum shifting phase difference between shift values instructed to respective lines as initial values to be less than 180°, two lines can be prevented from shifting to the shift value of the peak at the same time point. Therefore, the drive signal generator 14 may instruct different shift values whose corresponding phase angles are different by 180° at most, as initial values, for respective power transmitters. Subsequently, the drive signal generator 14 may instruct shift values identical to the shift values instructed last time or shift values corresponding to phase angles larger by one than the phase angles corresponding to the shift values instructed last time.

Figure 10A:
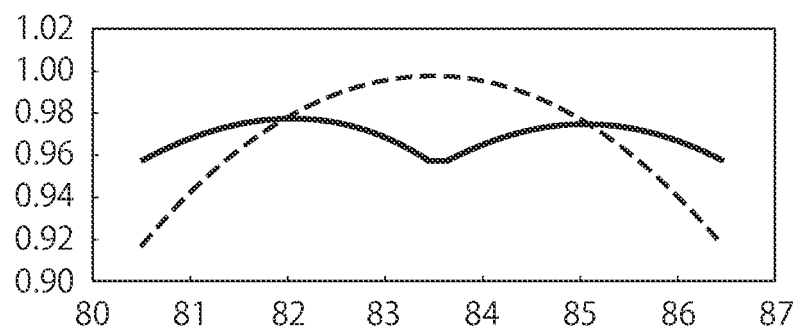
FIGS. 10A and 10B are diagrams illustrating differences in amplitude ratio when the shifting phase difference is kept at 180/M in the second example.
Figure 10B:
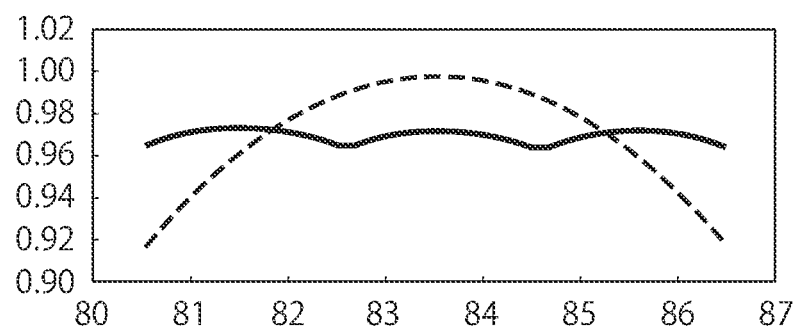

FIGS. 10A and 10B are diagrams illustrating differences in amplitude ratio when the shifting phase difference is kept at 180/M in the second example. FIG. 10A illustrates amplitude characteristics in the case of two lines. FIG. 10B illustrates amplitude characteristics in the case of three lines. Same as the first example illustrated in FIGS. 7A to 7C, regardless of the number of lines, the difference between the maximum amplitude ratio and the minimum amplitude ratio at the time of shifting phase adjustment is smaller than the difference between the maximum amplitude ratio and the minimum amplitude ratio in the case of in-phase. Accordingly, even in the second example, it is understood that adjusting the shifting phase can suppress the difference between the maximum amplitude ratio and the minimum amplitude ratio to be smaller than the case of not adjusting the shifting phase.

Even in the second example, the order of shifting is not limited to the triangular wave shifting. For example, as illustrated in FIG. 8C, the frequency shifting direction may be set to either the ascending order or the descending order in both the line A and the line B.

Although the interval of frequency shifting by the frequency hopping varies depending on the shifting number, the spread bandwidth and the like, it is assumed that the frequency shifting is performed at intervals of approximately 50 μsec to 500 μsec. Therefore, in order to avoid any complicated control, it is preferred to calculate the setting values such as shift values, shifting timing, phase difference of drive signals in advance. These setting values may be calculated each time while the frequency hopping is performed. In this case, writing from a main central processing unit (CPU) to a hardware register frequently occurs at very short intervals for the processing capability of a generic computer device incorporating the electric power transmission device 1 according to the present embodiment. Changing the register each time during the frequency hopping is not preferred because it spends much of the processing capability of the CPU and much of the writing band to the memory for the processing relating to the frequency hopping.

For example, it may be useful to use a memory table that stores values such as shift values, length of period for sustaining the frequency, clock division ratio for changing the frequency, phase difference between drive signals for changing the frequency, and the like. The order of shifting the shift values may be implemented on the hardware. When setting values are written from the main CPU to the memory table, it is preferred to perform the writing in a state where the load of the main CPU is light, for example, before starting the power transmission. Thereby, in response to a signal instructing the frequency hopping from the main CPU, the hardware can automatically perform the frequency hopping and conduction angle control processing.

Alternatively, aside from the main CPU, a, dedicated circuit for the frequency hopping and the conduction angle control, e.g. a digital signal processor (DSP), is also provided in a power transmission circuit. In this manner, it is preferred to cause an arithmetic unit including a hardware device, a DSP, and a memory, which is independent from the main CPU, to perform the frequency hopping and the conduction angle control processing.

Next, the electric power reception device 2 will be described. Each power receptor of the electric power reception device 2 receives electric power through the magnetic field generated by a corresponding power transmitter 13. In particular, mutual induction generates high-frequency current at the power reception coil unit 211 in the power receptor. Same as the power transmission coil unit 132, the coil type of the power reception coil unit 211 may be any type.

The rectifier 212 rectifies the high-frequency current supplied from the power reception coil unit 211. For example, the rectifier 212 may be configured by a diode. DC currents outputting from respective rectifiers 212 in respective lines are added by the adder 22 and the added current is supplied to a power supply destination. It is assumed that the power supply destination is a battery or any other electric device. The power supply destination may be an internal device or an external device of the electric power reception device 2.

Figure 11:
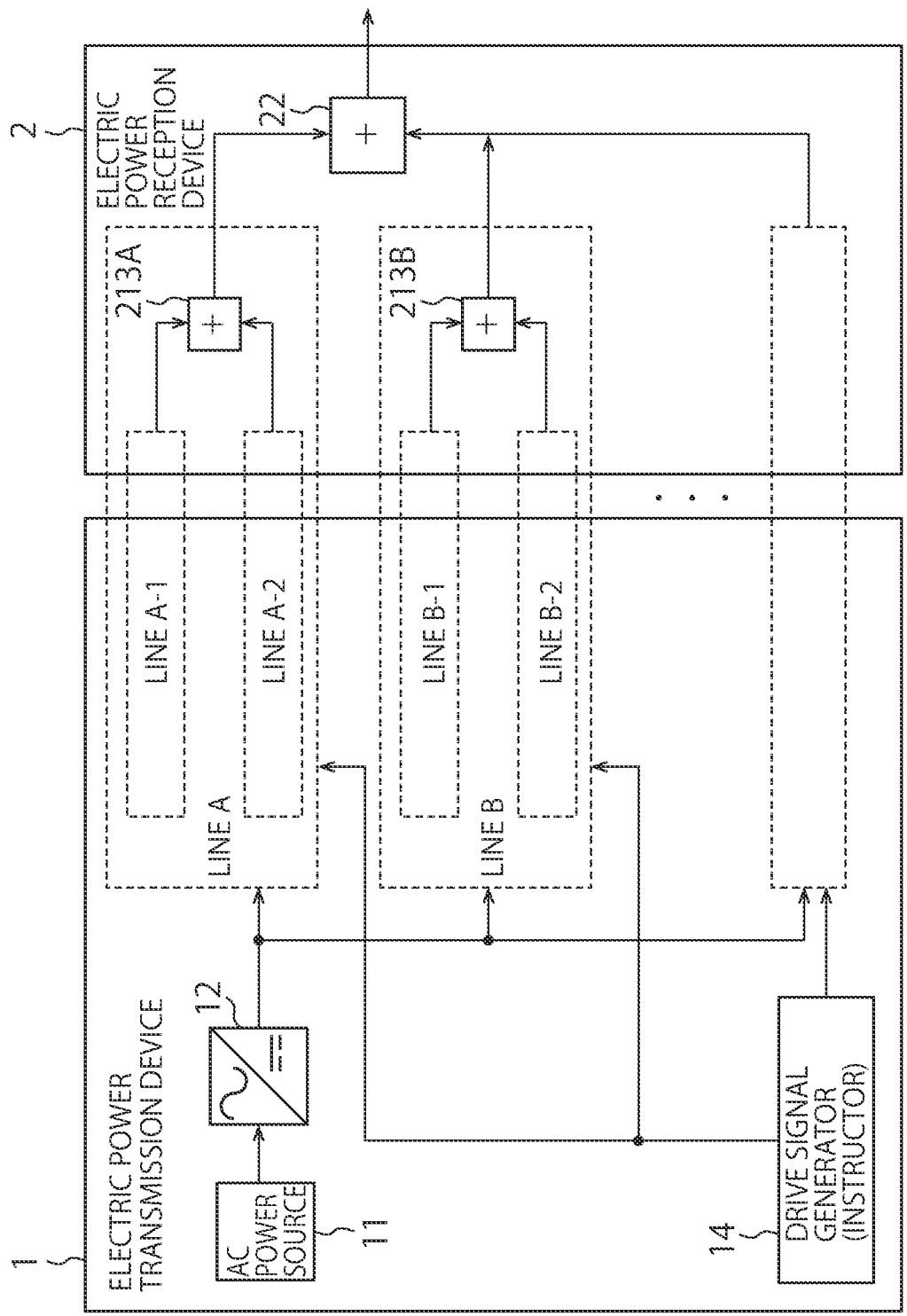
FIG. 11 is a diagram illustrating a modified example of the first embodiment.

In the above description, it is assumed that the shifting phases are all shifted for respective lines. However, depending on the configuration, it may be unnecessary to shift the shifting phases of all lines. FIG. 11 is a diagram illustrating a modified example of the first embodiment. Each line includes sub-lines. Two sub-lines A-1 and A-2 are provided in the line A and two sub-lines B-1 and B-2 are provided in the line B, although the number of the sub-lines is not limited. Further, it is assumed that each sub-line includes constituent the same components as those of the above-described lines, although not illustrated in the drawings.

Each sub-line belonging to the same line shifts to the same frequency at the same time point. That is, drive signals supplied to respective sub-lines belonging to the same line are the same in frequency. Therefore, no ripple is suppressed with respect to the output current of each line. However, by combining it with output currents of other lines, the electric power reception device 2 can output a current suppressed in ripple, in the same manner as above.

As mentioned above, in a case where a plurality of lines is divided into a plurality of groups and where each of the groups and lines included in the group regarded as line and sub-lines respectively, not all lines in the electric power transmission system are different in shifting phase.

Further, an adder 213 for adding high-frequency currents from the sub-lines in each line is additionally provided in each line. For example, an adder 213A belonging to the line A adds currents of the sub-lines A-1 and A-2 and output the added current as a current of the line A. However, it is not always necessary to sum up the currents of respective sub-lines in each line. For example, the adder 22 may be configured to sum up all of the currents from respective sub-lines of respective lines.

As mentioned above, according to the first embodiment, the shifting phase difference between respective lines can be adjusted when performing the frequency hopping. As a result, the total electric power of the electric power reception device 2 can be suppressed from fluctuating in amplitude. That is, ripple width can be suppressed.

Second Embodiment

Figure 12:
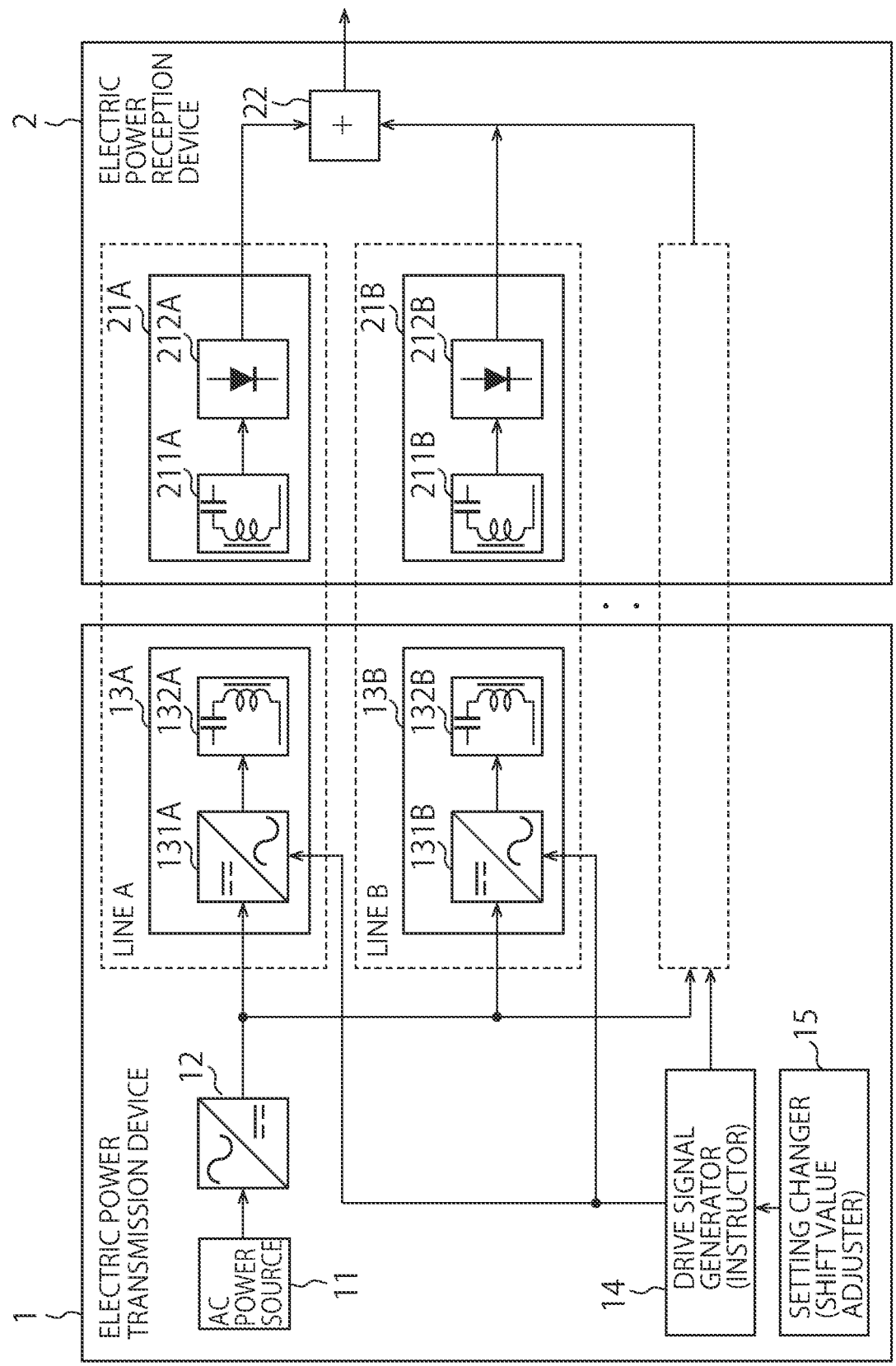
FIG. 12 is a block diagram illustrating an example of an electric power transmission system according to a second embodiment.

FIG. 12 is a block diagram illustrating an exemplary electric power transmission system according to a second embodiment. The electric power transmission device 1 according to the second embodiment additionally includes a setting changer 15 (a shift value adjuster). Compared to the first embodiment, the second embodiment including the setting changer 15 can perform electric power transmission with appropriate setting values.

The setting changer 15 confirms shift values registered beforehand for the frequency hopping, and changes any setting value which may cause a problem. In particular, the setting changer 15 performs the following two changes.

(Deletion of a Combination of Shift Values of Respective Lines at Each Time Point)

When the shift values of the line A and the line B at the same time point are not sufficiently separated from each other, the frequency hopping may not be effective as expected. The frequency hopping is for reducing the density of electromagnetic field intensity by spreading the leakage electromagnetic field energy on the frequency axis. However, when the shift values of the line A are close to the shift values of the line B, the electromagnetic field density in the frequency band around these shift values is doubled and a strong leakage electromagnetic field is generated. In particular, when the difference in shift values of the line A and the line B is smaller than a resolution bandwidth (RBW) of a measurement device that measures the leakage electromagnetic field, the intensity of the electromagnetic field by the line A and the intensity of the electromagnetic field by the line B are integrated and may be observed as the intensity of a single electromagnetic field. Accordingly, in order to prevent the leakage electromagnetic field density from increasing, it is preferred that the difference in shift value between the lines A and B be equal to or greater than two times the RBW.

Therefore, in order to prevent the generation of a strong leakage electromagnetic field, the setting changer 15 confirms the setting of shift values and prevents any setting that may cause a problem from being used. In particular, the setting changer 15 determines whether the difference in shift value between the lines A and B at the same time point is less than a predetermined threshold value. Then, if it is determined that the difference is less than the predetermined threshold value, the setting changer 15 prohibits using the combination of the shift values of the lines A and B relating to this determination. The predetermined threshold value is, for example, two times the RBW.

Figure 13:
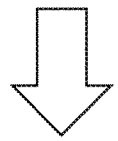
FIG. 13 is a diagram illustrating processing relating to deletion of a combination of shift values of respective lines at each time point.

FIG. 13 is a diagram illustrating processing relating to the deletion of a combination from shift values of respective lines at each time point. The upper table of FIG. 13 illustrates exemplary setting of shift values of the lines A and B at each time point. When the difference between $f_3$ and $f_4$ is less than the threshold value, the setting changer 15 removes the combination of $f_3$ and $f_4$, and changes it to a combination scheduled at the next time point. The lower table of FIG. 13 illustrates exemplary setting of shift values of the lines A and B after the change. Although the upper table of FIG. 13 includes the combination of $f_3$ and $f_4$ as shift values at the third time point and the fourth time point, the lower table of FIG. 13 includes the combination of shift values initially set for the fifth time point as the combination of shift values at the third time point. Also, the lower table includes the combination of shift values initially set for the sixth time point as the combination of shift values at the fourth time point. In this manner, before starting the frequency hopping, the setting changer 15 can confirm the shifting pattern in advance and remove any setting that may cause a problem. As a result, the drive signal generator 14 can issue an instruction based on the changed setting table.

In the case of including three or more lines, if the difference in shift value between any two of the shift values of a plurality of lines is less than the threshold value, using such a combination may be prohibited. Alternatively, considering only the physically neighboring lines, if the difference in shift value between the neighboring lines is equal to or greater than the threshold value, it may be determined that this combination is usable. Also, a flag for prohibiting the drive signal generator 14 from using this combination may be given to the setting table.

As mentioned above, the setting changer 15 may determine whether a combination of shift values scheduled to be instructed to a plurality of power transmitters is usable based on a difference between any two of the shift values belonging to this combination. The drive signal generator 14 may instruct shift values to each power transmitter based on the combination of the shift values determined to be usable. Thereby, no leakage electromagnetic field is added between the lines, and generating a strong leakage electromagnetic field can be prevented.

(Determination of Shift Values to be Used in Each Line)

In the above-described embodiments, shift values to be used in each line are the same although the shifting order of the shift values is changed in each line. Here, it is assumed that the setting changer 15 divides the shift values into some groups so that shift values to be used are differentiated for each line. For example, the setting changer 15 determines that the line A uses shift values $f_1$ to $f_k$ (k is an integer greater than 1), the line B uses shift values $f_{k+1}$ to $f_{2k}$, and the line C uses shift values $f_{2k+1}$ to $f_{3k}$. In this manner, given shift values may be allocated to a group corresponding to each line.

Differentiating the frequency band to be used in each line brings that the leakage electromagnetic field is not added between lines, and then it can prevent a strong leakage electromagnetic field from being generated. Even in this case, in order to reduce the ripple, it is preferred to set the sum of shift values of respective lines as even as possible at each time point.

Figure 14A:
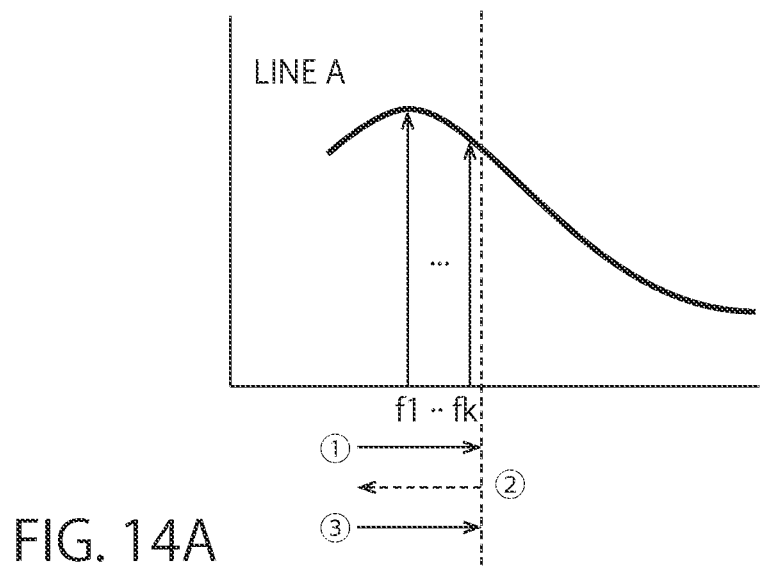
FIGS. 14A and 14B are diagrams illustrating an exemplary shifting in the case of differentiating shift values for each line.
Figure 14B:
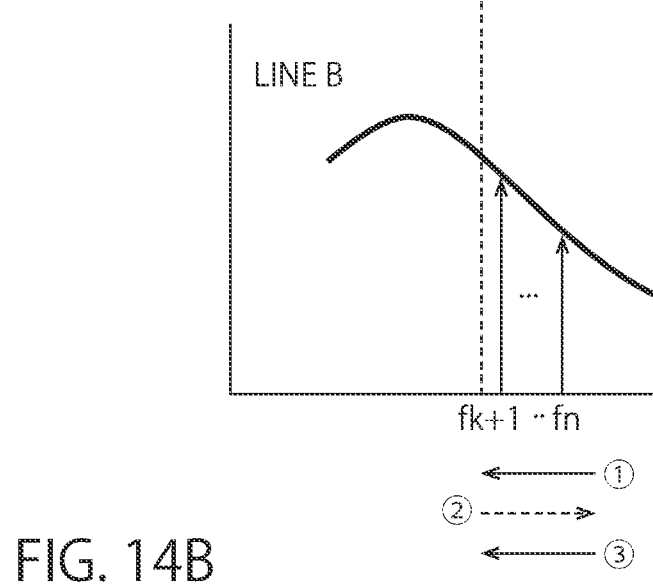

FIGS. 14A and 14B are diagrams illustrating an exemplary shifting in the case of differentiating shift values for each line. According to the example illustrated in FIGS. 14A and 14B, the shift values to be used are on the right side of the frequency related to the peak of the amplitude ratio (that is, when the minimum value of the shift value is greater than the frequency related to the peak of the amplitude ratio). The shift value range may be on the left side of the peak of the amplitude ratio (that is, when the maximum value of the shift value is smaller than the frequency related to the peak of the amplitude ratio).

The shift values $f_1$ to $f_k$ are allocated to the line A, and the shift values $f_{k+1}$ to $f_n$ are allocated to the line B. In this case, the phase difference between the line A and the line B need not be adjusted. However, in the case where the allocated shifting number is the same, that is, when $f_n = f_{2k}$, it is preferred that the difference between the shifting phase by the shift values $f_1$ to $f_k$ of the line A and the shifting phase by the shift values $f_{k+1}$ to $f_n$ of the line B be kept at 360/M, because the sum of the shift values is equalized between the lines A and B. The shifting phase by the shift values $f_{k+1}$ to $f_n$ of the line B means that the shifting phase of $f_{k+1}$ is 0° and the shifting phase of $f_{2k}$ is 180° when shifting in ascending order and, after shifting to $f_{k+1}$ in descending order, the shifting phase of $f_{k+1}$ is 360°.

Figure 15A:
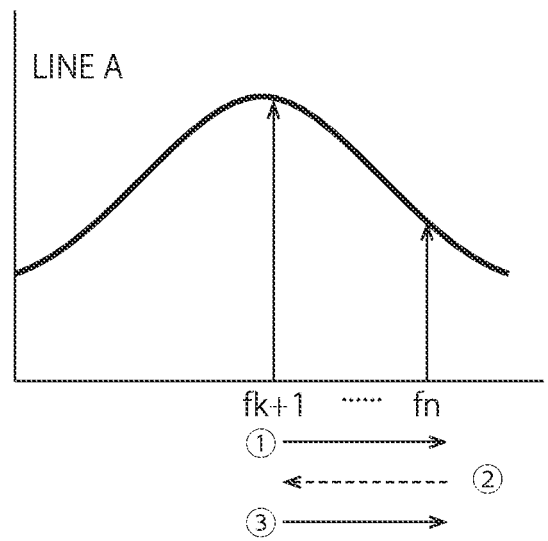
FIGS. 15A and 15B are diagrams illustrating another exemplary shifting in the case of differentiating shift values for each line.
Figure 15B:
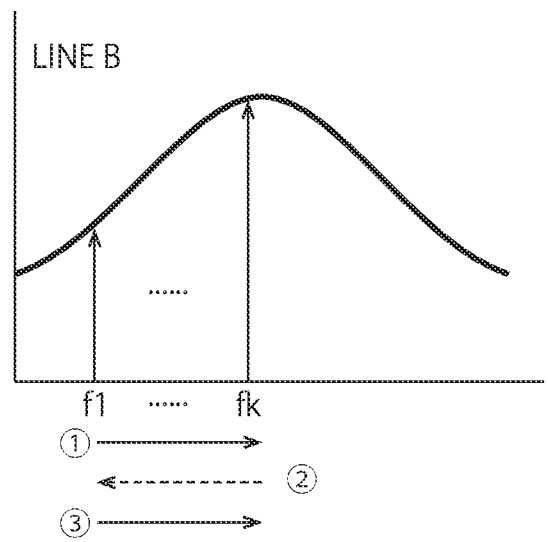

FIGS. 15A and 15B are diagrams illustrating another exemplary shifting in the case of differentiating shift values for each line. According to the example illustrated in FIGS. 15A and 15B, the shift values to be used in two lines are present on both sides of the peak of the amplitude ratio (according to this example, the maximum shift value of the line A is smaller than the frequency related to the peak of the amplitude ratio, and the minimum shift value of the line B is greater than the frequency related to the peak of the amplitude ratio). Even in the example illustrated in FIGS. 15A and 15B, the phase difference between the line A and the line B need not be adjusted. However, in the case where the allocated shifting number is the same, it is preferred that the difference between the shifting phase by the shift values $f_1$ to $f_k$ of the line A and the shifting phase by the shift values $f_{k+1}$ to $f_n$ of the line B be kept at 0°, because the sum of the shift values is equalized between the line A and the line B.

As mentioned above, the setting changer 15 may divide a plurality of shift values into at least two groups based on the magnitude of each shift value and determine a corresponding group for each power transmitter. Then, the drive signal generator 14 may instruct, to the power transmitter 13, shift values belonging to the group corresponding to the power transmitter 13. Thereby, no leakage electromagnetic field is added between the lines, and it is possible to prevent a strong leakage electromagnetic field from being generated.

The processing of the setting changer 15 has only to be performed before the electric power transmission device 1 actually starts power transmission. Both the deletion of combined shift values and the determination of shift values may be performed or only one of them may be performed. In the case of performing both of them, there is no particular limitation in the order. Further, the setting changer 15 independently performs the processing of them. Therefore, description of the flow of this processing is omitted.

As mentioned above, according to the second embodiment, the setting changer 15 adjusts the shift value to be used in each line. Thereby, in the same manner as the other embodiment, the ripple can be reduced. Further, it is possible to avoid such a situation that a strong leakage electromagnetic field is generated because the shift values are close to each other at a certain time point.

Third Embodiment

In a third embodiment, exemplary arrangements of the power reception coil unit 211 in the case of using the electric power transmission system according to the above-described embodiments will be illustrated.

Figure 16:
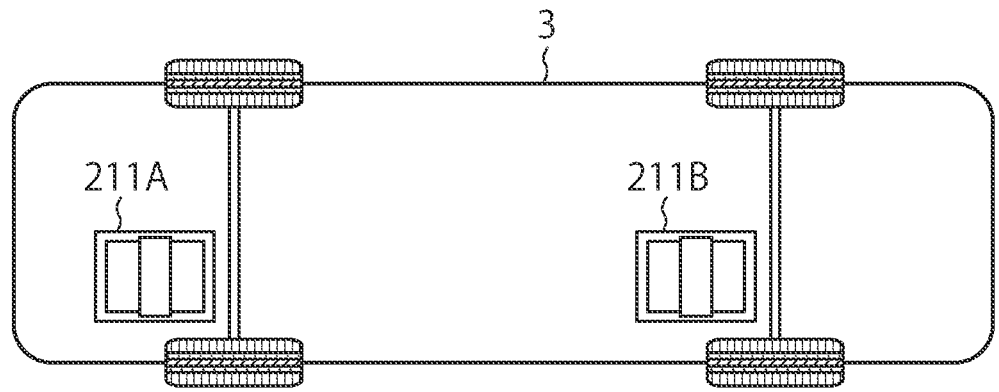
FIG. 16 is a diagram illustrating an exemplary arrangement of power reception coil units.

FIG. 16 is a diagram illustrating an exemplary arrangement of the power reception coil units 211. According to the example illustrated in FIG. 16, the electric power transmission system is used for supply electric power to a battery of an electric car or the like. The arrangement of two power reception coil units 211 for the lines A and B is illustrated.

It is assumed that the power transmission coil units 132 are arranged at corresponding positions on a ground surface, although not shown.

When performing electric power transmission with a plurality of lines, if mutual coupling occurs between different lines, for example, between the power reception coil unit 211A of the line A and the power reception coil unit 211B of the line B, the electric power transmission efficiency decreases. Therefore, according to the example illustrated in FIG. 16, in order to prevent the mutual coupling, the power reception coil units 211 of the lines A and B are arranged apart from each other so as not to occur the mutual coupling.

Figure 17:
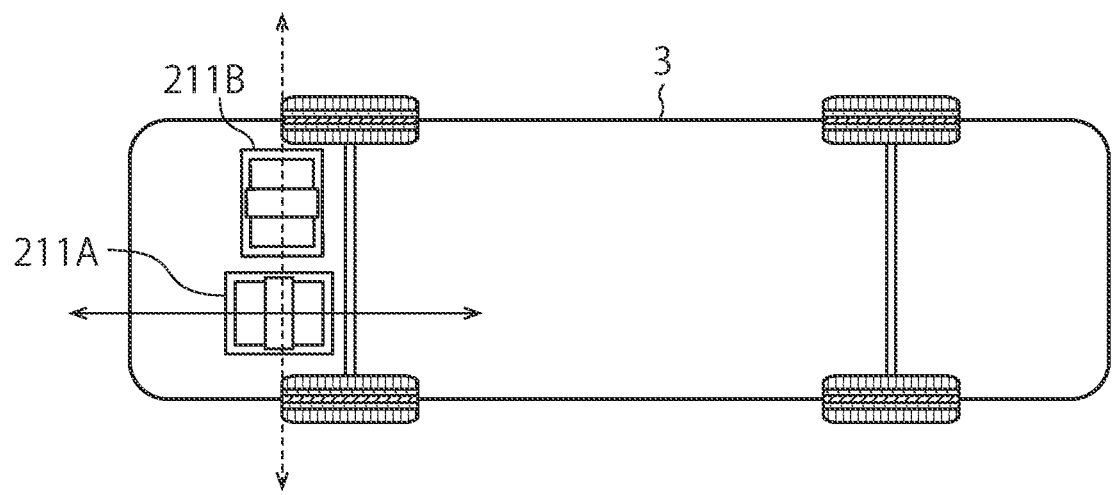
FIG. 17 is a diagram illustrating an exemplary arrangement of power reception coil units that are a solenoid type.

FIG. 17 is a diagram illustrating an exemplary arrangement of the power reception coil units 211 that are the solenoid type. According to the example illustrated in FIG. 17, it is assumed that each power reception coil unit 211 includes a coil of the solenoid type. The solenoid type coil includes a core and a coil wound around the core (windings). The solenoid type coil generates a magnetic field in a direction perpendicular to a coil aperture surface (in the axial direction of the windings). Hereinafter, a direction perpendicular to the coil aperture surface is referred to as a direction of the solenoid type coil.

According to the example illustrated in FIG. 17, the magnetic field of the line A generates in the lateral direction (solid arrow direction) on a horizontal plane, and the magnetic field of the line B generates in the vertical direction (dotted arrow direction). Therefore, since the generated magnetic fields are substantially orthogonal to each other, no mutual coupling occurs. Further, even in this arrangement, it is possible to reduce the ripple by making the frequencies of the lines A and B different. Arranging the directions of the solenoid type coils of the lines A and B so as to be substantially orthogonal to each other as mentioned above can prevent the mutual coupling from occurring between the line A and the line B. Accordingly, it is possible to arrange the power reception coil units 211 of the lines A and B close to each other.

Figure 18:
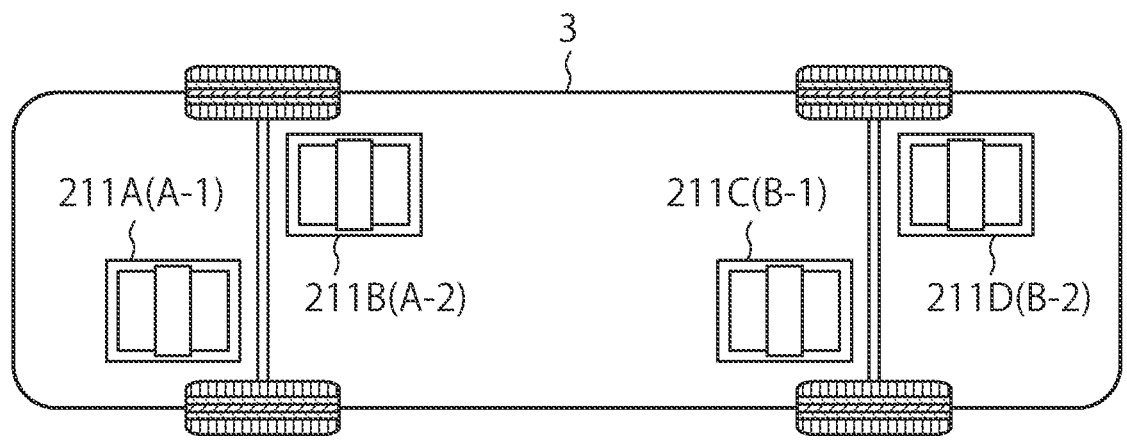
FIG. 18 is a diagram illustrating an exemplary arrangement of power reception coil units utilizing the reversed phase.

FIG. 18 is a diagram illustrating an exemplary arrangement of the power reception coil units 211 utilizing the reversed phase. The power reception coil units 211 of the lines A and B are arranged within a distance where the mutual coupling may occur. Similarly, the power reception coil units 211 of the lines C and D are arranged within a distance where the mutual coupling may occur. The lines A and B belong to a first group and the lines C and D belong to a second group. Further, the power reception coil units 211 of the first group and the power reception coil units 211 of the second group are arranged apart from each other so as to keep a sufficient distance for preventing the mutual coupling.

According to the example illustrated in FIG. 18, although the directions of the solenoid type coils in respective groups are not substantially orthogonal and substantially parallel to each other, the mutual coupling between the coils can be suppressed to a required value or less because they are arranged obliquely. It is known that, the directions of the magnetic fields generated in respective lines in the same group are reversed and the leakage electromagnetic fields can be cancelled, when high-frequency signals flowing in the power reception coil units 211 of respective groups are differentiated by 180° in phase of waveform (hereinafter, referred to as waveform phase), that is, when adjusted to be in a reversed phase relationship. In order to utilize this fact, according to the example illustrated in FIG. 18, the lines A and B belonging to the first group are adjusted so as to be differentiated by 180° in waveform phase. Similarly, the lines C and D belonging to the second group are adjusted so as to be differentiated by 180° in waveform phase. Thereby, it is possible to cancel the leakage electromagnetic fields in the same group and reduce the leakage electromagnetic field.

In particular, the waveform phases of high-frequency signals of the inverters 131 of respective lines in the same group are set to be opposite in phase. Thereby, high-frequency signals flowing in the power reception coil units 211 of respective lines become opposite in phase. In order to make the waveform phases of high-frequency signals of the inverter 131 opposite to each other, the drive signal generator 14 may continuously supply drive signals different by 180° in waveform phase to corresponding two lines.

The coils in a reversed phase relationship need to be the same in frequency. Hence, it is impossible to make the frequencies of the lines belonging to the same group different. According to the example illustrated in FIG. 18, the line A and the line B are the same in frequency, and the line C and the line D are the same in frequency. However, the frequencies of the first and second groups can be made different because the distance between them is more than a distance where the mutual coupling can occur. Therefore, as the example illustrated in FIG. 11, the drive signal generator 14 instructs the lines belonging to the same group to shift to the same frequency at the same time point and instructs the lines belonging to different groups to shift to different frequencies at the same time point. Thus, same as the example illustrated in FIG. 11, the electric power reception device 2 can output a current suppressed in ripple.

Since the same frequency is used within the same group and different frequencies are for different groups, a configuration similar to the modified example of the first embodiment illustrated in FIG. 11 may be used. In this case, the line A corresponds to the line A-1, the line B corresponds to the line A-2, the line C corresponds to the line B-1, and the line D corresponds to the line B-2.

In the case of using the configuration of the modified example of the first embodiment, the drive signal generator 14 may output drive signals for the line A and drive signals for the line B that are different from the drive signals for the line A by 180° in the shifting phase, so that the drive signals are separated into drive signals different by 180° in waveform phase in the line A and the line B. For example, a phase inversion element may be used to invert the phase of one of two drive signals separated. Thereby, the number of drive signals output from the drive signal generator 14 can be reduced, and the processing and the circuit configuration of the drive signal generator 14 can be simplified.

Figure 19:
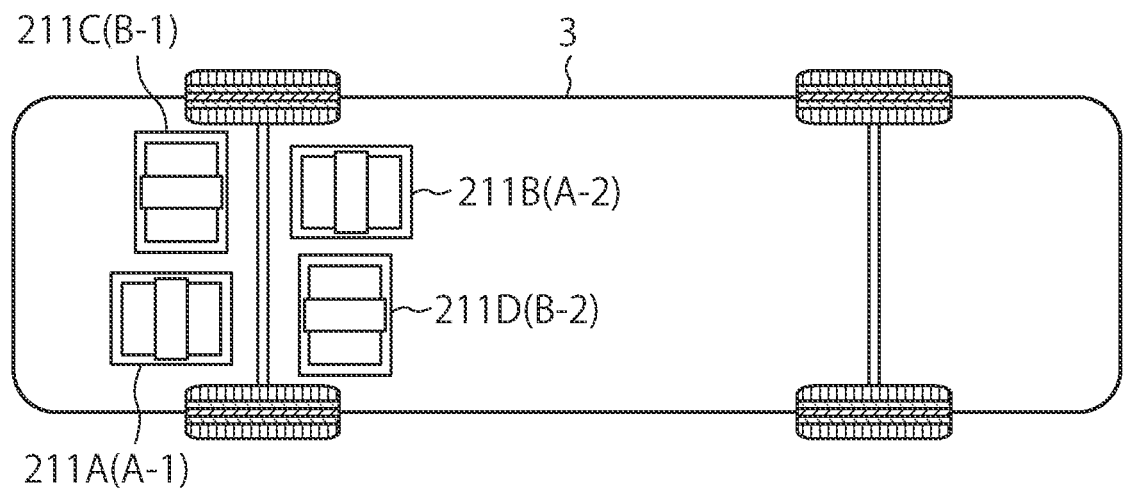
FIG. 19 is a diagram illustrating an exemplary arrangement of power reception coil units utilizing the reversed phase when the power reception coil units use coils of the solenoid type.

FIG. 19 is a diagram illustrating an exemplary arrangement of the power reception coil units 211 utilizing the reversed phase when the power reception coil units 211 use coils of the solenoid type. There are two combinations of the power reception coil units 211 that are the same in the direction of the solenoid type coils. The solenoid type coils of each combination are arranged so that the directions thereof are substantially orthogonal to each other. Further, solenoid type coils of the same combination are arranged to be substantially parallel to each other although they are not on the same straight line. In addition, all the solenoid type coils are arranged so as not to overlap with each other in plan view. Here, a combination to which the line A and the line B (or the line A-1 and the line A-2) arranged substantially parallel to each other belong is referred to as a first group. A combination to which the line C and the line D (or the line B-1 and the line B-2) arranged substantially parallel to each other is referred to as a second group. Even in the example illustrated in FIG. 19, the configuration of the modified example of the first embodiment may be used.

Same as the example illustrated in FIG. 18, the power reception coil units 211 belonging to each group cancel their leakage electromagnetic fields by reversing in phase the drive signals for the corresponding inverters 131. That is, the line A and the line B (or the line A-1 and the line A-2) belonging to the first group are adjusted to be different by 180° in waveform phase. In addition, the line C and the line D (or the line B-1 and the line B-2) belonging to the second group are adjusted to be different by 180° in waveform phase. Further, since the coils belonging to different groups are substantially orthogonal to each other in solenoid type coil direction, no mutual coupling occurs between respective groups, same as the example illustrated in FIG. 17. Hence, it is possible to make the frequency different between the first group and the second group. Therefore, the drive signal generator 14 instructs different shift values for the first group and the second group, thereby reducing the ripple of the output current of the electric power reception device 2 and realizing the arrangement illustrated in FIG. 19 in which four power reception coil units 211 can positioned closely. It is also possible to additionally arrange power reception coil units 211 in distant positions where no mutual coupling with the four power reception coil units 211 occurs.

As mentioned above, by using the drive signals and the arrangement of the power reception coil units 211 for canceling leakage electromagnetic fields, two or more power reception coil units 211 can be arranged closely. As a result, in a system using the electric power transmission system, for example, in a system for charging batteries of an electric vehicle, the problem of space can be solved and the amount of transmittable electric power can be increased.

The controls in the embodiments described above may be performed only in a specific period, such as a period in which reducing the ripple is required. In this case, shifting to an arbitrary frequency is not restricted in a period in which no control is performed. In addition, the above-described controls may be performed only for a specific line and it is not always necessary to perform the controls for all lines.

Although it is assumed that a dedicated circuit realizes each processing in the present embodiment, a program stored in a memory of the CPU may realize processing relating to circuit control, such as instruction of timing for changing the frequency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and, their equivalents are intended to cover such forms or modifications as would fall within the scope and spirit of the inventions.

The invention claimed is:

1. An electric power transmission device comprising:
    a first power transmitter configured to:
        generate a first magnetic field comprising a first frequency band and a first phase for transmitting electric power;
        receive a first instruction signal regarding a first shift value; and
        generate a second magnetic field for transmitting electric power after receiving the first instruction signal, wherein:
            the second magnetic field comprises a second frequency band that is at least partially different from the first frequency band and a second phase that is different from the first phase, and
            a first difference between the first frequency band and the second frequency band and a second difference between the first phase and the second phase are identifiable by the first shift value;
    a second power transmitter configured to:
        generate a third magnetic field for transmitting electric power, wherein:
            the third magnetic field comprises a third frequency band and a third phase, and
            a generation period of the first magnetic field and a generation period of the third magnetic field are at least partially overlapped for transmitting electric power;
        receive a second instruction signal regarding a second shift value; and
        generate a fourth magnetic field for transmitting electric power after receiving the second instruction signal, wherein:
            the fourth magnetic field comprises a fourth frequency band that is at least partially different from the third frequency band and a fourth phase that is different from the third phase,
            a third difference between the third frequency band and the fourth frequency band and a fourth difference between the third phase and the fourth phase are identifiable by the second shift value, and
            a generation period of the second magnetic field and a generation period of the fourth magnetic field are at least partially overlapped for transmitting the electric power; and
    controller circuitry configured to transmit the first instruction signal regarding the first shift value to the first power transmitter and the second instruction signal regarding the second shift value to the second power transmitter, wherein
        the first shift value and the second shift value are ones of a plurality of predetermined shift values,
        in the case of expressing the shift values and shifting directions by phase angle when one cycle of periodic shifting including an ascending shift from a minimum value of the plurality of shift values to a maximum value and a descending shift from the maximum value to the minimum value is regarded as 360°,
        when the frequency related to a peak of amplitude characteristics of the magnetic field is not present between the minimum value and the maximum value,
        the controller circuitry instructs different shift values as initial values to the first power transmitter and the second power transmitter, and
        after instructing the initial values, the controller circuitry instructs a shift value identical to that instructed last time or a shift value corresponding to a phase angle that is larger by one than the phase angle corresponding to the shift value instructed last time to the first power transmitter and the second power transmitter.

2. The electric power transmission device according to claim 1, wherein:
the first power transmitter includes:
an inverter configured to generate high-frequency current from DC current; and
a power transmission coil configured to generate the first and second magnetic fields when the high-frequency current flows,
the second power transmitter includes:
an inverter configured to generate high-frequency current from DC current; and
a power transmission coil configured to generate the third and fourth magnetic fields when the high-frequency current flows,
the first instruction signal is a drive signal for the inverter of the first power transmitter,
the second instruction signal is a drive signal for the inverter of the second power transmitter,
the frequency of the high-frequency current in the first power transmitter shifts as the frequency of the first instruction signal changes to a value corresponding to the first shift value, and
the frequency of the high-frequency current in the second power transmitter shifts as the frequency of the second instruction signal changes to a value corresponding to the second shift value.

3. The electric power transmission device according to claim 1, wherein
the first shift value and the second shift value are ones of a plurality of predetermined shift values,
the first power transmitter is instructed a shift value corresponding to a phase angle equal to or greater than 0° and less than 180° as an initial value,
the second power transmitter is instructed a shift value corresponding to a phase angle equal to or greater than 180° and less than 360° as an initial value,
when instructing a shift value corresponding to a phase angle of 180° to the first power transmitter, the controller circuitry instructs a shift value corresponding to the phase angle of 0° in the next instruction to the first power transmitter, and
when instructing a shift value corresponding to a phase angle of 360° to the second power transmitter, the controller circuitry instructs a shift value corresponding to the phase angle of 180° in the next instruction to the second power transmitter.

4. The electric power transmission device according to claim 1, wherein
the first shift value and the second shift value are ones of a plurality of predetermined shift values,
the electric power transmission device comprises M (M is an integer equal to or greater than 2) power transmitters including at least the first power transmitter and the second power transmitter, and
the difference between phase angles corresponding to any two of shift values of the M power transmitters at the same time point is substantially coincident with any one of multiples from 1 to M−1 for 360/M.

5. The electric power transmission device according to claim 3, wherein
the first shift value and the second shift value are ones of a plurality of predetermined shift values,
the electric power transmission device comprises M (M is an integer equal to or greater than 2) power transmitters including at least the first power transmitter and the second power transmitter, and
the difference between phase angles corresponding to any two of the shift values of the M power transmitters at the same time point is substantially coincident with any one of multiples from 1 to M−1 for 180/M.

6. An electric power transmission device comprising:
a first power transmitter configured to:
generate a first magnetic field comprising a first frequency band and a first phase for transmitting electric power;
receive a first instruction signal regarding a first shift value; and
generate a second magnetic field for transmitting electric power after receiving the first instruction signal, wherein:
the second magnetic field comprises a second frequency band that is at least partially different from the first frequency band and a second phase that is different from the first phase, and
a first difference between the first frequency band and the second frequency band and a second difference between the first phase and the second phase are identifiable by the first shift value;
a second power transmitter configured to:
generate a third magnetic field for transmitting electric power, wherein:
the third magnetic field comprises a third frequency band and a third phase, and
a generation period of the first magnetic field and a generation period of the third magnetic field are at least partially overlapped for transmitting electric power;
receive a second instruction signal regarding a second shift value; and
generate a fourth magnetic field for transmitting electric power after receiving the second instruction signal, wherein:
the fourth magnetic field comprises a fourth frequency band that is at least partially different from the third frequency band and a fourth phase that is different from the third phase,
a third difference between the third frequency band and the fourth frequency band and a fourth difference between the third phase and the fourth phase are identifiable by the second shift value, and
a generation period of the second magnetic field and a generation period of the fourth magnetic field are at least partially overlapped for transmitting the electric power; and
controller circuitry configured to transmit the first instruction signal regarding the first shift value to the first power transmitter and the second instruction signal regarding the second shift value to the second power transmitter, wherein
the first shift value and the second shift value are ones of a plurality of predetermined shift values,
in the case of expressing each shift value by phase angle when one cycle of periodic shifting including an ascending shift from a minimum value of the plurality of shift values to a maximum value and a descending shift from the maximum value to the minimum value is regarded as 360°,
when the frequency related to a peak of amplitude characteristics of the magnetic field is present between the minimum value and the maximum value,
the controller circuitry instructs different shift values whose corresponding phase angles are different by 180° at most as initial values to the first power transmitter and the second power transmitter, and after instructing the initial values, the controller circuitry instructs a shift value identical to that instructed last time or a shift value corresponding to a phase angle that is larger by one than the phase angle corresponding to the shift value instructed last time to the first power transmitter and the second power transmitter.

7. An electric power transmission device comprising:

a first power transmitter configured to:
  generate a first magnetic field comprising a first frequency band and a first phase for transmitting electric power;
  receive a first instruction signal regarding a first shift value; and
  generate a second magnetic field for transmitting electric power after receiving the first instruction signal, wherein:
    the second magnetic field comprises a second frequency band that is at least partially different from the first frequency band and a second phase that is different from the first phase, and
    a first difference between the first frequency band and the second frequency band and a second difference between the first phase and the second phase are identifiable by the first shift value;

a second power transmitter configured to:
  generate a third magnetic field for transmitting electric power, wherein:
    the third magnetic field comprises a third frequency band and a third phase, and
    a generation period of the first magnetic field and a generation period of the third magnetic field are at least partially overlapped for transmitting electric power;
  receive a second instruction signal regarding a second shift value; and
  generate a fourth magnetic field for transmitting electric power after receiving the second instruction signal, wherein:
    the fourth magnetic field comprises a fourth frequency band that is at least partially different from the third frequency band and a fourth phase that is different from the third phase,
    a third difference between the third frequency band and the fourth frequency band and a fourth difference between the third phase and the fourth phase are identifiable by the second shift value, and
    a generation period of the second magnetic field and a generation period of the fourth magnetic field are at least partially overlapped for transmitting the electric power; and controller circuitry configured to transmit the first instruction signal regarding the first shift value to the first power transmitter and the second instruction signal regarding the second shift value to the second power transmitter a shift value adjuster circuitry configured to output a signal indicating whether a combination of shift values scheduled to be instructed to the first power transmitter and the second power transmitter is usable based on a difference between any two of shift values belonging to the combination, wherein
  the first shift value and the second shift value are ones of a plurality of predetermined shift values, the controller circuitry instructs shift values to the first power transmitter and the second power transmitter based on the combination of shift values determined to be usable.

8. An electric power transmission device comprising:

a first power transmitter configured to:
  generate a first magnetic field comprising a first frequency band and a first phase for transmitting electric power;
  receive a first instruction signal regarding a first shift value; and
  generate a second magnetic field for transmitting electric power after receiving the first instruction signal, wherein:
    the second magnetic field comprises a second frequency band that is at least partially different from the first frequency band and a second phase that is different from the first phase, and
    a first difference between the first frequency band and the second frequency band and a second difference between the first phase and the second phase are identifiable by the first shift value;

a second power transmitter configured to:
  generate a third magnetic field for transmitting electric power, wherein:
    the third magnetic field comprises a third frequency band and a third phase, and
    a generation period of the first magnetic field and a generation period of the third magnetic field are at least partially overlapped for transmitting electric power;
  receive a second instruction signal regarding a second shift value; and
  generate a fourth magnetic field for transmitting electric power after receiving the second instruction signal, wherein:
    the fourth magnetic field comprises a fourth frequency band that is at least partially different from the third frequency band and a fourth phase that is different from the third phase,
    a third difference between the third frequency band and the fourth frequency band and a fourth difference between the third phase and the fourth phase are identifiable by the second shift value, and
    a generation period of the second magnetic field and a generation period of the fourth magnetic field are at least partially overlapped for transmitting the electric power; and controller circuitry configured to transmit the first instruction signal regarding the first shift value to the first power transmitter and the second instruction signal regarding the second shift value to the second power transmitter;

wherein
  the first shift value and the second shift value are ones of a plurality of predetermined shift values,
  a shift value adjuster circuitry configured to divide the plurality of shift values into at least two groups based on the magnitude thereof and output a signal indicating a group corresponding to the first power transmitter and the second power transmitter, and
  the controller circuitry instructs, to the first power transmitter and the second power transmitter, shift values belonging to a group corresponding to the first power transmitter and the second power transmitter.

9. An electric power transmission system comprising:
an electric power transmission device; and
an electric power reception device,
wherein
the electric power transmission device includes:
a first power transmitter configured to:
generate a first magnetic field for transmitting electric power, wherein the first magnetic field comprises a first frequency band and a first phase;
receive a first instruction signal regarding a first shift value;
generate a second magnetic field for transmitting electric power after receiving the first instruction signal, wherein:
the second magnetic field comprises a second frequency band that is at least partially different from the first frequency band and a second phase that is different from the first phase, and
a first difference between the first frequency band and the second frequency band and a second difference between the first phase and the second phase are identifiable by the first shift value;
a second power transmitter configured to:
generate a third magnetic field for transmitting electric power, wherein:
the third magnetic field comprises a third frequency band and a third phase, and
a generation period of the first magnetic field and a generation period of the third magnetic field are at least partially overlapped for transmitting electric power;
receive a second instruction signal regarding a second shift value; and
generate a fourth magnetic field for transmitting electric power after receiving the second instruction signal, wherein:
the fourth magnetic field comprises a fourth frequency band that is at least partially different from the third frequency band and a fourth phase that is different from the third phase,
a third difference between the third frequency band and the fourth frequency band and a fourth difference between the third phase and the fourth phase are identifiable by the second shift value, and
a generation period of the second magnetic field and a generation period of the fourth magnetic field are at least partially overlapped for transmitting electric power;
controller circuitry configured to transmit the first instruction signal regarding the first shift value to the first power transmitter and the second instruction signal regarding the second shift value to the second power transmitter; and
the electric power reception device includes:
a first power reception coil and a second power reception coil configured to generate high-frequency current by the first magnetic field and the second magnetic field; and
an adder circuitry configured to add the high-frequency currents from the first power reception coil and the second power reception coil, wherein
the first shift value and the second shift value are ones of a plurality of predetermined shift values,
the electric power transmission device further includes a third power transmitter and a fourth power transmitter configured to generate magnetic fields for transmitting electric power and configured to repeatedly shift frequency bands in accordance with the shift values,
the electric power reception device further includes a third power reception coil and a fourth power reception coil configured to generate high-frequency current by the magnetic field of the third power transmitter and the fourth power transmitter, the first and second power reception coils are arranged in such a manner that directions of magnetic fields received by the first and second power reception coils are substantially parallel to each other in plan view,
the third and fourth power reception coils are arranged in such a manner that directions of magnetic fields received by the third and fourth power reception coils are substantially parallel to each other in plan view,
a combination of the first and second power reception coils and a combination of the third and fourth power reception coils are arranged apart from each other so as to keep a distance for preventing mutual coupling from occurring,
magnetic fields generated by the first and second power transmitters are in a reversed phase relationship,
magnetic fields generated by the third and fourth power transmitters are in a reversed phase relationship, and
the controller circuitry instructs the same shift values to the first and second power transmitters, while instructing, for the third and fourth power transmitters, the same shift values that are different from the shift values instructed to the first and second power transmitters.

10. The electric power transmission system according to claim 9, wherein
the first shift value and the second shift value are ones of a plurality of predetermined shift values,
the first power reception coil and the second power reception coil are arranged in such a manner that directions of magnetic fields received by the first and second power reception coils are substantially orthogonal to each other in plan view, and
the controller circuitry instructs the shift values in such a manner that the magnetic fields of the first power transmitter and the second power transmitter are different in frequency.

11. An electric power transmission system comprising:
an electric power transmission device; and
an electric power reception device,
wherein
the electric power transmission device includes:
a first power transmitter configured to:
generate a first magnetic field for transmitting electric power, wherein the first magnetic field comprises a first frequency band and a first phase;
receive a first instruction signal regarding a first shift value;
generate a second magnetic field for transmitting electric power after receiving the first instruction signal, wherein:
the second magnetic field comprises a second frequency band that is at least partially different from the first frequency band and a second phase that is different from the first phase, and
a first difference between the first frequency band and the second frequency band and a second difference between the first phase and the second phase are identifiable by the first shift value;

a second power transmitter configured to:
generate a third magnetic field for transmitting electric power, wherein:
the third magnetic field comprises a third frequency band and a third phase, and
a generation period of the first magnetic field and a generation period of the third magnetic field are at least partially overlapped for transmitting electric power;
receive a second instruction signal regarding a second shift value; and
generate a fourth magnetic field for transmitting electric power after receiving the second instruction signal, wherein:
the fourth magnetic field comprises a fourth frequency band that is at least partially different from the third frequency band and a fourth phase that is different from the third phase,
a third difference between the third frequency band and the fourth frequency band and a fourth difference between the third phase and the fourth phase are identifiable by the second shift value, and
a generation period of the second magnetic field and a generation period of the fourth magnetic field are at least partially overlapped for transmitting electric power;

controller circuitry configured to transmit the first instruction signal regarding the first shift value to the first power transmitter and the second instruction signal regarding the second shift value to the second power transmitter; and the electric power reception device includes:
a first power reception coil and a second power reception coil configured to generate high-frequency current by the first magnetic field and the second magnetic field; and an adder circuitry configured to add the high-frequency currents from the first power reception coil and the second power reception coil, wherein the first shift value and the second shift value are ones of a plurality of predetermined shift values, the electric power transmission device further includes a third power transmitter and a fourth power transmitter configured to generate magnetic fields for transmitting electric power and configured to repeatedly shift frequency bands in accordance with ones of the shift values, the electric power reception device further includes a third power reception coil and a fourth power reception coil configured to generate high-frequency current by the magnetic field of the third power transmitter and the fourth power transmitter, the first to fourth power reception coils are arranged in such a manner that: directions of magnetic fields received by the first and second power reception coils are substantially parallel to each other in plan view; directions of magnetic fields received by the third and fourth power reception coils are substantially parallel to each other in plan view; and the directions of the magnetic fields received by the first and second power reception coils are substantially orthogonal to the directions of the magnetic fields received by the third and fourth power reception coils in plan view, magnetic fields generated by the first and second power transmitters are in a reversed phase relationship, magnetic fields generated by the third and fourth power transmitters are in a reversed phase relationship, and the controller circuitry instructs the same shift values to the first and second power transmitters, while instructing, for the third and fourth power transmitters, the same shift values that are different from the shift values instructed to the first and second power transmitters.

* * * * *